(12) United States Patent
Komatsu et al.

(10) Patent No.: US 7,436,130 B2
(45) Date of Patent: Oct. 14, 2008

(54) COLD-CATHODE TUBE LIGHTING DEVICE FOR USE IN A PLURALITY OF COLD-CATHODE TUBES LIT BY TWO LOW-IMPEDANCE POWER SOURCES

(75) Inventors: Akeyuki Komatsu, Osaka (JP); Eiji Miyake, Osaka (JP); Kenji Kawataka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 174 days.

(21) Appl. No.: 10/578,200

(22) PCT Filed: Apr. 21, 2005

(86) PCT No.: PCT/JP2005/007652

§ 371 (c)(1),
(2), (4) Date: Jul. 11, 2006

(87) PCT Pub. No.: WO2005/109967

PCT Pub. Date: Nov. 17, 2005

(65) Prior Publication Data

US 2007/0132406 A1    Jun. 14, 2007

(30) Foreign Application Priority Data

May 10, 2004    (JP) .............................. 2004-139406

(51) Int. Cl.
*H05B 37/02*    (2006.01)
(52) U.S. Cl. ...................................... 315/307; 315/246

(58) Field of Classification Search ............. 315/209 R, 315/224–225, 246–247, 276, 291, 307–308, 315/312; 345/102, 87, 204
See application file for complete search history.

(56) References Cited

U.S. PATENT DOCUMENTS 4,508,996 A * 4/1985 Clegg et al. .................. 315/224
5,959,412 A    9/1999 Ushijima (Continued)

FOREIGN PATENT DOCUMENTS

JP    5-90897    12/1993

(Continued)

*Primary Examiner*—Thuy Vinh Tran
*Assistant Examiner*—Tung X Le
(74) *Attorney, Agent, or Firm*—Wenderoth, Lind & Ponack, L.L.P.

(57) ABSTRACT

A cold-cathode tube lighting device uniformly lights a plurality of cold-cathode tubes using a common power source, and maintains the luminance of each cold-cathode tube uniformly in the longitudinal direction thereof at high precision. A first block converts a direct-current voltage to one pair of alternating-voltages. Since leakage impedances of step-up transformers are low, the first block functions as one pair of low-impedance power sources. Each second block is connected to each cold-cathode tube. A ballast inductor stabilizes tube current by resonating with a matching capacitor during lighting of the cold-cathode tube. A combined impedance of the matching capacitor and a peripheral stray capacitance is matched with an impedance of the ballast inductor, for each cold-cathode tube. Since a delay circuit shifts phases of two pulse waves with respect to each other, a phase difference between the alternating-voltages is shifted from 180°.

18 Claims, 14 Drawing Sheets

U.S. PATENT DOCUMENTS

| | | | |
|---|---|---|---|
| 6,222,327 B1* | 4/2001 | Shoji et al. | 315/291 |
| 6,559,606 B1* | 5/2003 | Chou et al. | 315/194 |
| 6,661,181 B2* | 12/2003 | Shin | 315/169.4 |
| 6,714,111 B2 | 3/2004 | Suzuki | |
| 6,864,644 B2* | 3/2005 | Kernahan | 315/307 |
| 6,979,957 B2* | 12/2005 | Lee et al. | 315/195 |
| 7,034,800 B2* | 4/2006 | Nakatsuka et al. | 345/102 |
| 7,038,397 B2 | 5/2006 | Komatsu et al. | |
| 2002/0047615 A1* | 4/2002 | Yokozeki et al. | 315/248 |
| 2004/0095081 A1* | 5/2004 | Kernahan | 315/307 |
| 2004/0207339 A1* | 10/2004 | Lin et al. | 315/291 |
| 2004/0232853 A1* | 11/2004 | Hur et al. | 315/291 |
| 2005/0134192 A1* | 6/2005 | Ellams | 315/209 R |
| 2005/0156534 A1* | 7/2005 | Oh | 315/247 |
| 2005/0285478 A1* | 12/2005 | Takeda et al. | 310/318 |
| 2007/0052664 A1* | 3/2007 | Hirakata et al. | 345/102 |

FOREIGN PATENT DOCUMENTS

| | | |
|---|---|---|
| JP | 6-19299 | 3/1994 |
| JP | 6-301034 | 10/1994 |
| JP | 8-122776 | 5/1996 |
| JP | 8-273862 | 10/1996 |
| JP | 8-288086 | 11/1996 |
| JP | 2002-353044 | 12/2002 |
| JP | 2004-119206 | 4/2004 |
| JP | 2004-241136 | 8/2004 |
| JP | 2005-63941 | 3/2005 |
| WO | 02/078403 | 10/2002 |
| WO | 03/056885 | 7/2003 |

\* cited by examiner

COLD-CATHODE TUBE LIGHTING DEVICE FOR USE IN A PLURALITY OF COLD-CATHODE TUBES LIT BY TWO LOW-IMPEDANCE POWER SOURCES

TECHNICAL FIELD

The present invention relates to a cold-cathode tube lighting device. In particular, the present invention relates to a device for lighting a plurality of cold-cathode tubes.

BACKGROUND ART

Fluorescent tubes are classified roughly into hot-cathode tubes and cold-cathode tubes depending on the configuration of the electrodes thereof. The electrodes of a cold-cathode tube (also referred to as a CCFL) are formed of substances that emit numerous electrons through the application of high voltage. Namely, the electrodes do not include any filaments for emitting thermal electrons, unlike the case of the hot-cathode tubes. For this reason, the cold-cathode tubes are particularly advantageous over the hot-cathode tubes in terms of very small tube diameter, long life and low power consumption. Because of the advantages, the cold-cathode tubes are mainly used frequently for products strongly requested to be made thinner (or smaller in size) and lower in power consumption, such as the backlights of liquid crystal displays, the light sources of facsimiles and scanners.

The cold-cathode tubes have electrical characteristics of higher firing potential, smaller discharge current (referred to as tube current hereinafter) and higher impedance than the hot-cathode tubes. In particular, the cold-cathode tubes have such negative resistance characteristics that the resistance value thereof drops abruptly as the tube current thereof increases. The configuration of a cold-cathode tube lighting device is devised so as to conform to these electrical characteristics of the cold-cathode tubes. In particular, since thinning (downsizing) and electric power saving are emphasized for devices to which the cold-cathode tubes are applied, the cold-cathode tube lighting device is also strongly requested to be made smaller in size (particularly thinner) and lower in power consumption.

For example, as a cold-cathode tube lighting device according to a prior art, the device described below has been known (for example, see Patent documents 1 and 2). FIG. 14 is a circuit diagram showing a configuration of the cold-cathode tube lighting device according to the prior art. The cold-cathode tube lighting device according to the prior art includes a high-frequency oscillation circuit 100, a step-up transformer "T" and an impedance matching part 200.

The high-frequency oscillation circuit 100 converts a direct-current voltage supplied from a direct-current power source DC into an alternating-voltage having a high frequency, and applies the alternating-voltage to a primary winding L1 of the step-up transformer "T". The step-up transformer "T" generates a voltage, which is extremely higher than a primary voltage, across both ends of a secondary winding L2 thereof. The high secondary voltage "V" is applied across both ends of a cold-cathode tube FL via the impedance matching part 200. For example, the impedance matching part 200 includes a series circuit of a choke coil "L" and a capacitor "C". In this case, the capacitor "C" includes stray capacitances in the periphery of the cold-cathode tube FL. Impedance matching is performed between the step-up transformer "T" and the cold-cathode tube FL by adjusting the inductance of the choke coil "L" and the capacitance of the capacitor "C".

During the time when the cold-cathode tube FL is off, when a voltage is applied to the primary winding L1 of the transformer "T", a voltage VR across both ends of the cold-cathode tube FL is raised abruptly by a resonance of the choke coil "L" and the capacitor "C" of the impedance matching part 200, and the voltage VR exceeds a firing potential. As a result, the cold-cathode tube FL starts discharging and begins to emit light. Then, a resistance value of the cold-cathode tube FL drops abruptly as the tube current IR increases (negative resistance characteristics). Along with this drop in the resistance value of the cold-cathode tube FL, the voltage VR across both ends of the cold-cathode tube FL drops. At that time, the tube current IR is maintained stably by the action of the impedance matching part 200, regardless of the change in the voltage VR across both ends of the cold-cathode tube FL. Namely, the luminance of the cold-cathode tube FL is maintained stably.

In FIG. 14, the secondary winding L2 of the step-up transformer "T" and the choke coil "L" are shown as circuit elements different from each other. However, in an actual cold-cathode tube lighting device, a secondary winding of one leakage flux transformer was used for three purposes of step-up, choking and impedance matching. Accordingly, both the number of components and the size were reduced. Namely, in the cold-cathode tube lighting device according to the prior art, the leakage flux transformer was regarded as particularly advantageous in downsizing and thus used frequently.

Generally speaking, in the cold-cathode tube FL, the stray capacitance between the tube wall and the external grounding conductor (such as a case or reflecting plate of a liquid crystal display) is caused. For example, in such a configuration that one of the electrodes of the cold-cathode tube FL is grounded as in the cold-cathode tube lighting device disclosed in the patent document 1, only the electric potential of the other electrode fluctuates greatly with respect to the ground potential. Accordingly, when the stray capacitance between the tube wall and the external part is excessive, the leakage current flowing between the tube wall and the external increases excessively particularly near above-mentioned the other electrode. Particularly when the code cathode tube FL is long, the excessive increase of the leakage current may impair the uniformity of the tube current in the longitudinal direction. As a result, an imbalance in luminance may occur in the longitudinal direction of the cold-cathode tube FL.

In order to further raise the uniformity of the luminance in the longitudinal direction the cold-cathode tube, an intermediate point of the electrode potentials at both ends of the cold-cathode tube FL is preferably maintained at the ground potential. For example, with regards to the cold-cathode tube lighting device according to the prior art shown in FIG. 14, the secondary winding L2 of the step-up transformer "T" is grounded at a neutral point M2 thereof, and equivalent ballasts are connected to both ends of the cold-cathode tube FL, respectively (See patent document 2). By this configuration, the intermediate point of the electrode potentials at both ends is maintained at the ground potential. Namely, the electrode potentials at both ends are maintained asymmetrically with respect to the ground potential and the electrode potentials are fluctuated equally. Accordingly, in the cold-cathode tube FL, the distribution of the leakage current flowing between each part of the tube wall and the external is symmetrical with respect to the central part of the cold-cathode tube FL. Accordingly, in each cold-cathode tube, the imbalance in luminance in the longitudinal direction thereof is reduced, and this leads to the improved uniformly.

Further, when the intermediate point of the electrode potentials at both ends of the cold-cathode tube FL is maintained at the ground potential, the amplitude of the electrode potential with respect to the ground potential is halved while the amplitude of the voltage across both ends of the cold-cathode tube FL is maintained, unlike the case where the electrode at one end of the cold-cathode tube FL is grounded. Accordingly, since the leakage current is reduced, the imbalance of the distribution of the leakage current is reduced. Accordingly, the imbalance in luminance in the longitudinal direction of the cold-cathode tube FL is further reduced, and this leads to the further improved uniformly.

Patent document 1: Japanese patent laid-open publication No. 8-273862.

Patent document 2: Japanese patent laid-open publication No. 8-122776.

DISCLOSURE OF INVENTION

Problems to be Solved by the Invention

High luminance is particularly requested for the backlight of a liquid crystal display. Accordingly, when cold-cathode tubes are used as the backlight, it is desired that a plurality of cold-cathode tubes are installed. At that time, the luminance values of the plurality of cold-cathode tubes must be made uniform. In addition, the cold-cathode tube lighting device thereof must be small in size. For the purpose of meeting these needs, it is desired that the plurality of cold-cathode tubes are driven in parallel using a common power source.

However, the parallel driving of the plurality of cold-cathode tubes using the common power source was difficult because of the following reasons.

The cold-cathode tubes have the negative resistance characteristics as described above. Accordingly, when the plurality of cold-cathode tubes are simply connected in parallel, current concentration occurs in only one of the cold-cathode tubes, and the only one cold-cathode tube can be lit eventually. Further, when the plurality of cold-cathode tubes are connected to the common power source, wires connected among them are different from each other, more particularly, their lengths are different from each other. Accordingly, stray capacitances of the cold-cathode tubes are different from each other. Accordingly, when the plurality of cold-cathode tubes are driven in parallel, it is necessary to control the tube current for each cold-cathode tube so as to suppress the variation in the tube current.

It was difficult to perform the following of (a) using one leakage flux transformer as a common choke coil for a plurality of cold-cathode tubes, (b) attaining highly accurate impedance matching between the leakage flux transformer and each of the cold-cathode tubes, and (c) highly accurately controlling the tube currents of the individual tubes. In this case, the difficulty remained similarly even when a piezoelectric transformer is used instead of the leakage flux transformer. Accordingly, in the cold-cathode tube lighting device according to the prior art, each of the cold-cathode tubes is provided with a power source (a leakage flux transformer, in particular), while tube current of each of the cold-cathodes tube is controlled to be uniform using the power source. Namely, in the cold-cathode tube lighting device according to the prior art, the power sources as many as the cold-cathode tubes were required. As a result, it was difficult to reduce the number of components so as to further downsize the whole device.

Further, for example, when the neutral point of the secondary winding of the leakage flux transformer is grounded and the ballasts are connected to each of both ends of the cold-cathode tube so as to maintain the intermediate point of the electrode potentials at both ends of the cold-cathode tube at ground potential, the neutral point of the secondary winding and the impedance of the ballast must be determined at high precision. In particular, the impedances should be coincided at high precision between the secondary windings divided into two. In a manner similar to above, the impedances should be coincided between two ballasts at high precision. Such high precision settings further make it difficult to lighten a plurality of cold-cathode tubes with using a common leakage flux transformer.

In addition, two ballasts are required for each cold-cathode tube, and thus reduction in the number of components is difficult, and thus further downsizing of the whole device is difficult.

An object of the present invention is to provide a cold-cathode tube lighting device that uniformly lights a plurality of cold-cathode tubes with using a common power source, that maintains uniformly the luminance, particularly, in the longitudinal direction of each of the plurality of cold-cathode tubes, and that can realize further downsizing and quality improvement.

Means for Solving the Problems

A cold-cathode tube lighting device according to the present invention includes a plurality of ballasts, a first low-impedance power source having an output impedance lower than a combined impedance of the cold-cathode tubes, a second low-impedance power source having an output impedance lower than the combined impedance of the cold-cathode tubes, and a phase correction circuit for adjusting a phase difference between an output from the first low-impedance power source and an output from the second low-impedance power source, so that electrode potentials at both ends of each of the cold-cathode tubes change in opposite phase with respect to each other. At least one of the ballasts is connected to an electrode at one end of each of a plurality of cold-cathode tubes. The first low-impedance power source is connected to the electrode at one end of each of the cold-cathode tubes via the ballasts, and the second low-impedance power source is connected to an electrode at the other end of each of the cold-cathode tube.

The cold-cathode tube lighting device is preferably installed into a liquid crystal display as described below. The liquid crystal display includes the plurality of cold-cathode tubes and a liquid crystal panel installed on the front side of the cold-cathode tubes, for shielding light emitted from the cold-cathode tubes using a predetermined pattern. The cold-cathode tube lighting device according to the present invention drives the above-mentioned plurality of cold-cathode tubes serving as the backlight of the liquid crystal display.

Generally speaking, the properties of the plurality of cold-cathode tubes vary among the plurality of cold-cathode tubes, and variation in the peripheral stray capacitance occurs by the difference in wirings. Further, the change in the environment condition, such as temperature, causes variation in the operating states of the cold-cathode tubes.

In the cold-cathode tube lighting device according to the present invention, the output impedance of the power source is suppressed, contrary to the presumption in the device according to the prior art. Instead, the ballast is connected to each of the cold-cathode tubes. In this case, since the output impedance of the power source is low, each of the ballasts operates substantially independently. Thus, the above-mentioned variations are canceled out precisely for each cold-cathode tube. Namely, no variation in tube current occurs among the plurality of cold-cathode tubes. Accordingly, luminance is maintained uniformly among the plurality of cold-cathode tubes.

Thus, the above-mentioned cold-cathode tube lighting device according to the present invention uniformly lights the plurality of cold-cathode tubes using the common low-impedance power sources.

In the cold-cathode tube lighting device according to the present invention, since the output impedance of the power source is low, each of the ballasts operates substantially independently. Thus, even if wires between the low-impedance power source and each ballast are long, and further, greatly differs for each ballast, no variation in tube current occurs among the plurality of cold-cathode tubes.

Preferably, the first low-impedance power source, the second low-impedance power source, and the phase correction circuit are mounted on a first substrate, and the ballast is mounted on a second substrate. More preferably, one end of each of the cold-cathode tubes is connected to the second substrate.

Generally speaking, the other circuit element such as a ballast has a size smaller than that of the low-impedance power source. Accordingly, when the first substrate mounted with the low-impedance power source is separated away from the other substrate, a part constructed by the second substrate and the cold-cathode tubes can be made thinner easily. For example, when the cold-cathode tubes are used as the back light of the liquid crystal display, the thinning of the display is realized easily.

Thus, in the cold-cathode tube lighting device according to the present invention, the layout of the wiring thereof is high in flexibility. In particular, separation of the above-mentioned substrates is easily achieved, while maintaining the luminance of the plurality of cold-cathode tubes uniform.

In the cold-cathode tube lighting device according to the present invention, the first low-impedance power source changes the electrode potential at one of each of the plurality of cold-cathode tubes, and the second low-impedance power source changes the electrode potential at the other end of each of the plurality of cold-cathode tubes. Frequencies of the outputs from the two low-impedance power source are set to be equal to each other. On the other hand, amplitudes of the outputs from the two low-impedance power source are set independently, so that the electrode potentials at both ends of each cold-cathode tube change at the same amplitude.

Further, the phase correction circuit adjusts the phase difference between the outputs from the two low-impedance power sources, so as to change the electrode potentials at both ends at each cold-cathode tube in opposite phase with respect to each other.

Thus, in each cold-cathode tube, an intermediate point of the electrode potentials at both ends thereof is maintained at the ground potential at high precision. Namely, the electrode potentials at both ends are maintained asymmetrically with respect to the ground potential.

In particular, in the cold-cathode tube lighting device according to the present invention, a circuit configuration between the first low-impedance power source and the electrode at one end of the cold-cathode tube may differ greatly from a circuit configuration between the second low-impedance power source and the electrode at the other end of the cold-cathode tube. Preferably, each ballast is connected only between the first low-impedance power source and the electrode at one of each cold-cathode tube.

In this case, the output of the first low-impedance power source is set to the amplitude different from that of the output of the second low-impedance power source. For example, when the ballast is an inductor, the output of the first impedance power source has the amplitude set to be smaller than that of the output of the second low-impedance power source. In addition, when the ballast is a capacitor, the output of the first low-impedance power source has the amplitude set to be greater than the amplitude of the output of the second low-impedance power source. Thus, since a difference in the amplitudes of the outputs from the two low-impedance power sources cancels out the change in amplitude by the ballast, the electrode potentials at both ends of the cold-cathode tube is changed at the same amplitude at high precision.

Further, the phase correction circuit shifts the phase difference between the outputs from the two low-impedance power sources by a predetermined amount from, for example, 180°. Thus, since the phase difference between the outputs from the low-impedance power sources cancel out the phase shift by the ballast, the phase difference between the electrode potentials at both ends of the cold-cathode tube is maintained equal to 180° at high precision.

In this case, since the low-impedance power source has a low output impedance, the settings of the amplitudes and the phase difference may be common for all the pairs of the cold-cathode tube and the ballast.

Thus, the electrode potentials at both ends of each of the cold-cathode tubes vary uniformly, while they are maintained asymmetrically with respect to the ground potential. Accordingly, in each of the cold-cathode tubes, the distribution of the leakage current flowing between each part of the tube wall and the external is symmetrical with respect to the central part of the cold-cathode tube. Accordingly, in each of the cold-cathode tubes, the imbalance in luminance in the longitudinal direction of each of the cold-cathode tubes is reduced, and this leads to the improved uniformity.

Further, when the intermediate point of the electrode potentials at both ends of each cold-cathode tube is maintained at the ground potential, the amplitude of the electrode potential with respect to the ground potential is halved while the amplitude of the voltage across both ends of each cold-cathode tube is maintained, unlike the case where the electrodes at one end of the cold-cathode tubes are grounded. Accordingly, since the leakage current is reduced, the imbalance of the distribution of the leakage current is reduced. Accordingly, the imbalance in luminance in the longitudinal direction of each of the cold-cathode tubes is further reduced, and this leads to the further improved uniformity.

In addition, by using the two step-up transformers, withstand voltages of the circuit elements included in the step-up transformers can be reduced by half compared to those when one step-up transformer is used. On the other hand, since the ballast needs to be connected only to one of the electrodes of each cold-cathode tube, the number of ballasts may be the same as the number of cold-cathode tubes. Accordingly, the downsizing of the cold-cathode tube lighting device according to the present invention is easily realized.

Preferably, in the cold-cathode tube lighting device according to the present invention, the phase correction circuit includes a delay circuit for delaying one of a first pulse signal for instructing an output timing with respect to the first low-impedance power source and a second pulse signal for instructing an output timing with respect to the second low-impedance power source, from the other signal by a constant quantity.

In the cold-cathode tube lighting device according to the present invention, the fluctuation of the operating state of each of the cold-cathode tubes is absorbed by the ballasts each connected to each of the cold-cathode-tubes. Accordingly, the phase difference between the outputs from the two low-impedance power sources is hardly affected by the variations in the operating state among the plurality of cold-cathode tubes. Accordingly, the phase difference simply needs to be maintained substantially at a constant quantity for all the cold-cathode tubes. The phase correction circuit easily maintains the phase difference between the outputs from the two low-impedance power sources to be equal to the constant quantity using the delay circuit.

Further preferably, the cold-cathode tube lighting device according to the present invention further includes a detector for detecting current flowing through the cold-cathode tubes, or an electrode potential at one end of each of the cold-cathode tubes, and the phase correction circuit changes the phase difference based on a detected value detected by the detector.

During the time when the cold-cathode tube is off, since the tube current thereof is small, the space between the electrodes at both ends thereof is opened. At that time, the amplitude of each electrode potential is large. Further, the phase shift by the ballast does not occur.

The phase correction circuit may stop the adjustment of the phase difference between the outputs from the power sources and fix the phase difference to 180°, during the period the detector does not detect the tube current of greater than or equal to a constant threshold, or during the period the detector does not detect the amplitude of the electrode potential at one end of the cold-cathode tube within a predetermined range. Here, since the phase shift of the output by the ballast does not occur, regardless of the presence of the action of the phase correction circuit, the electrode potentials at both ends of the cold-cathode tube change in opposite phase with respect to each other. In particular, when the phase correction circuit maintains the phase difference between the outputs from the two low-impedance power sources equal to the constant quantity using the delay circuit, the malfunction thereof can be avoided by stopping the delay circuit during the above period.

Preferably, in the cold-cathode tube lighting device according to the present invention, each of the first low-impedance power source and the second low-impedance power source comprises a transformer connected to the ballast capacitors, and the transformer has an output impedance lower than the combined impedance of the plurality of cold-cathode tubes. Thus, the output impedance of the transformer is suppressed, contrary to the presumption in the device according to the prior art. Accordingly, the power source having low output impedance is realized.

As a means effective for reducing the output impedance of the transformer, the transformer may includes a core, a primary winding being wound around the core, and a secondary winding being wound around at least one of the inside and outside of the primary winding. Thus, the leakage flux is reduced, and the output impedance is suppressed. Further, the adverse effect (for example, occurrence of noise) on the peripheral devices by the leakage flux is suppressed.

In this case, the secondary winding of the transformer may have one configuration of a sectional winding and a honeycomb winding. Thus, the line capacity is reduced. Accordingly, the self-resonance frequency of the secondary winding can be set to be sufficiently high. Therefor, according to the cold-cathode tube lighting device according to the present invention, the drive frequency of each of the cold-cathode tubes can be sufficiently high while maintaining stably the light emission of the plurality of cold-cathode tubes. The downsizing of the transformer and the downsizing of the whole device are therefore are easily realized.

In the cold-cathode tube lighting device according to the present invention, the low-impedance power source may include a power transistor connected to the ballasts, instead of the transformer. The use of the power transistor easily and effectively reduces the output impedance. Accordingly, the cold-cathode tube lighting device according to the present invention can uniformly light a greater number of cold-cathode tubes.

Preferably, in the cold-cathode tube lighting device according to the present invention, each of the ballasts includes an inductor. Thus, the inductor functions as a choke coil. Namely, the inductor and the stray capacitance in the periphery of the cold-cathode tube cause resonance, and this leads to application of a voltage of greater or equal to a firing potential to the cold-cathode tube. In this case, the actual firing potential varies among the plurality of cold-cathode tubes. However, in the cold-cathode tube lighting device according to the present invention, at least one ballast is connected to each cold-cathode tube. Accordingly, regardless of the variation of the actual firing potential, the voltage application from the common low-impedance power source reliably lights all the plurality of cold-cathode tubes.

In the above ballast, the inductor may have one configuration of a sectional winding and a honeycomb winding. Thus, the line capacity is reduced. Accordingly, the self-resonance frequency of the inductor can be set to be sufficiently high. Therefor, according to the cold-cathode tube lighting device according to the present invention, the drive frequency of each of the cold-cathode tubes can be sufficiently high while maintaining stably the light emission of the plurality of cold-cathode tubes. The downsizing of the ballast and the downsizing of the whole device are therefore are easily realized.

Further, in the above ballast, the inductor may include a saturable reactor. When the electric discharge in the cold-cathode tube is suddenly interrupted, and a voltage across both ends of the cold-cathode tube is drastically increased, the inductance of the ballast inductor LB is saturated so that further increase in the voltage is suppressed. Thus, the over voltage is prevented. The cold-cathode tube lighting device is high safety.

In the cold-cathode tube lighting device according to the present invention, the above ballast may include a capacitor (referred to as ballast capacitor hereinafter). The ballast capacitor preferably has an inter-layer capacity of a substrate. In this case, the substrate is, for example, a multi-layer circuit board or a flexible printed circuit board, and the cold-cathode tube lighting device according to the present invention, in particular, the connection parts thereof to the cold-cathode tubes are mounted on the substrate. Thus, the ballast capacitor is easily downsized, and the downsizing of the whole cold-cathode tube lighting device according to the present invention is easily realized.

The cold-cathode tube lighting device according to the present invention preferably includes matching capacitors, at least one of which is connected across a ground potential and the electrode at one end of each cold-cathode tube connected to the ballast. The each of the matching capacitors may have, for example, an inter-layer capacity of a substrate. In particular, an impedance of the ballast and an impedance of the matching capacitor are preferably matched with each other. Further, an impedance of the ballast, a combined impedance of the matching capacitor and a stray capacitance in the periphery of the cold-cathode tube, and an impedance of the cold-cathode tube during lighting are matched with each other. Thus, impedance matching between the ballast and the cold-cathode tube (and stray capacitance in the periphery thereof is realized for each combination of the ballast and the cold-cathode tube. Accordingly, the tube current is uniformly maintained among the plurality of cold-cathode tubes, and the luminance is uniformly maintained, regardless of the variations in the properties, the peripheral stray capacitance, and a voltage across both ends of the cold-cathode tube, among the plurality of cold-cathode tubes.

Effects of the Invention

Unlike the device according to the prior art, the above-mentioned cold-cathode tube lighting device according to the present invention includes a plurality of ballast capacitors, at least one of which is connected to each of a plurality of cold-cathode tubes, and a common low-impedance power source so as to uniformly lighten the plurality of cold-cathode tubes using the common power source. Further, the wires between the power source and the ballast capacitors may be long, and may be significantly different for each ballast capacitor, and therefore the layout of the wiring is high in flexibility. Accordingly, the downsizing of the whole device is realized more easily than that of the device according to the prior art.

Further, in the cold-cathode tube lighting device according to the present invention, the two low-impedance power sources separately change the electrode potentials at both ends of each of the plurality of cold-cathode tubes. In this case, the frequencies of the outputs from the two low-impedance power sources are set to be equal to each other. On the other hand, amplitudes of the outputs from the two low-impedance power source are set independently. In addition, the phase correction circuit adjusts the phase difference between the outputs from the two low-impedance power sources. Thus, even if a circuit configuration of a part between one low-impedance power source and the cold-cathode tubes, and a circuit configuration of a part between the other low-impedance power source and the cold-cathode tubes are greatly different from each other, the electrode potentials at both ends of each cold-cathode tube are maintained asymmetrically with respect to the ground potential. Accordingly, the uniformity of the luminance in the longitudinal direction of each cold-cathode tube is further raised.

Preferably, in the cold-cathode tube lighting device according to the present invention, the ballast is connected only to between the first low-impedance power source and the electrode at one end of each cold-cathode tube. Thus, only by using the ballasts of the same number as the cold-cathode tubes, the uniformity of the luminance in the longitudinal direction of each cold-cathode tube can be raised.

Further, when two low-impedance power sources are used as described above, the withstand voltages of the circuit elements included in the power sources are reduced by half compared to those when one low-impedance power source is used.

The downsizing of the cold-cathode tube lighting device according to the present invention is further easily realized.

For example, when the cold-cathode tube lighting device according to the present invention is used as the back light of the liquid crystal display, the display can be easily made thin.

DESCRIPTION OF NUMERICAL REFERENCES

Figure 1:
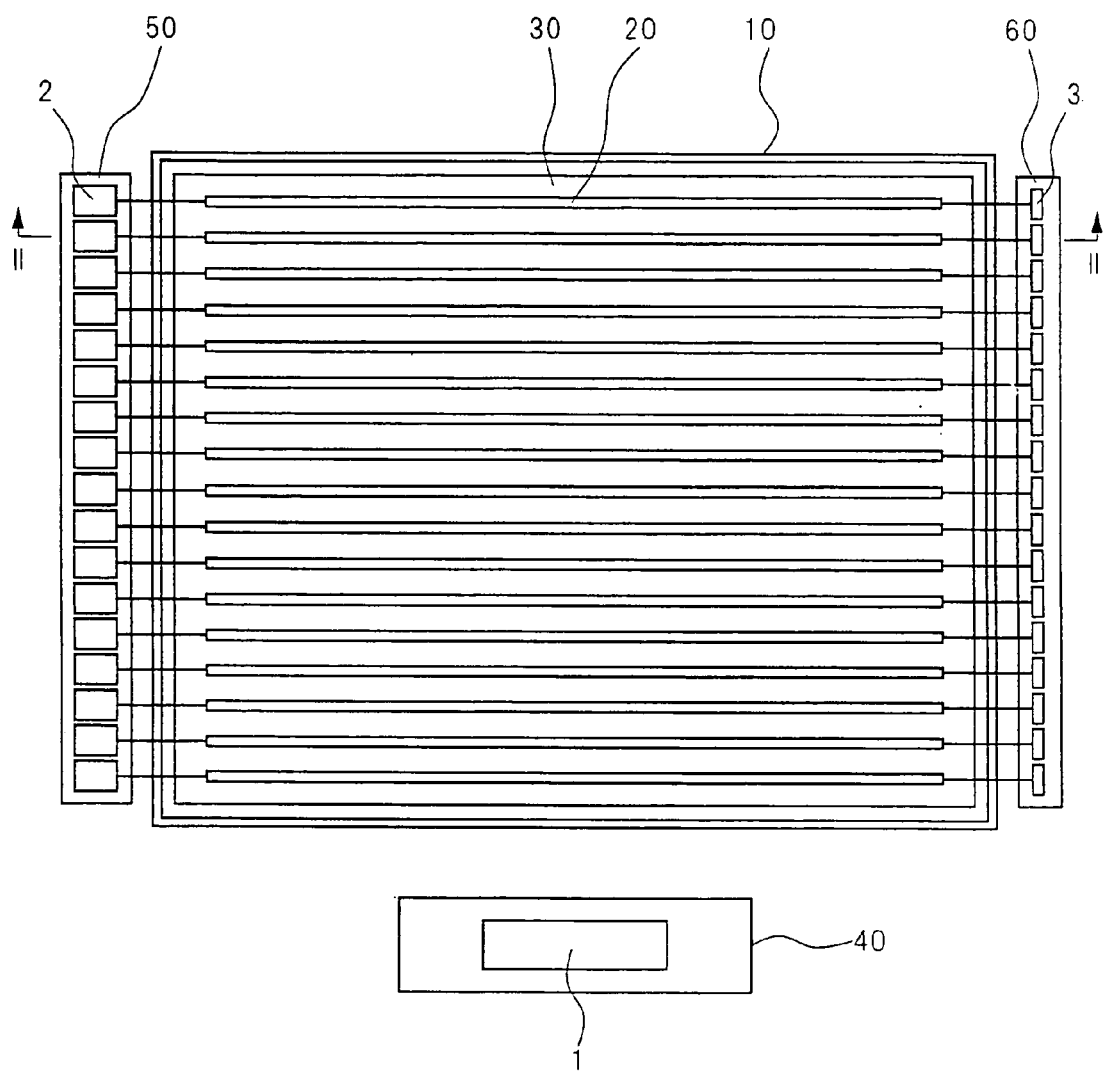
FIG. 1 is a front view showing an internal part of a liquid crystal display provided with a cold-cathode tube lighting device according to a first preferred embodiment of the present invention.

DC direct-current power source
1 first block (low-impedance power source)
4A first high-frequency oscillator circuit
4B second high-frequency oscillator circuit
Q1 first transistor
Q2 second transistor
In inverter
Lr inductor
Cr resonance capacitor
5A first step-up transformer
5B second step-up transformer
51A first primary winding
51B second primary winding
M1 neutral point of primary winding
52A first secondary winding
52B second secondary winding
6 phase collection circuit
Os oscillator
7 delay circuit
Rd resistor
Cd capacitor
Vr reference voltage source 8A comparator
8B first flip-flop
8C second flip-flop
2 second block
LB ballast inductor
CP overcurrent protection capacitor
CM matching capacitor
3 connection terminal
20 cold-cathode tube

BEST MODE FOR CARRYING OUT THE
INVENTION

Best preferred embodiments of the present invention will be described below referring to the drawings.

First Preferred Embodiment

Figure 2:
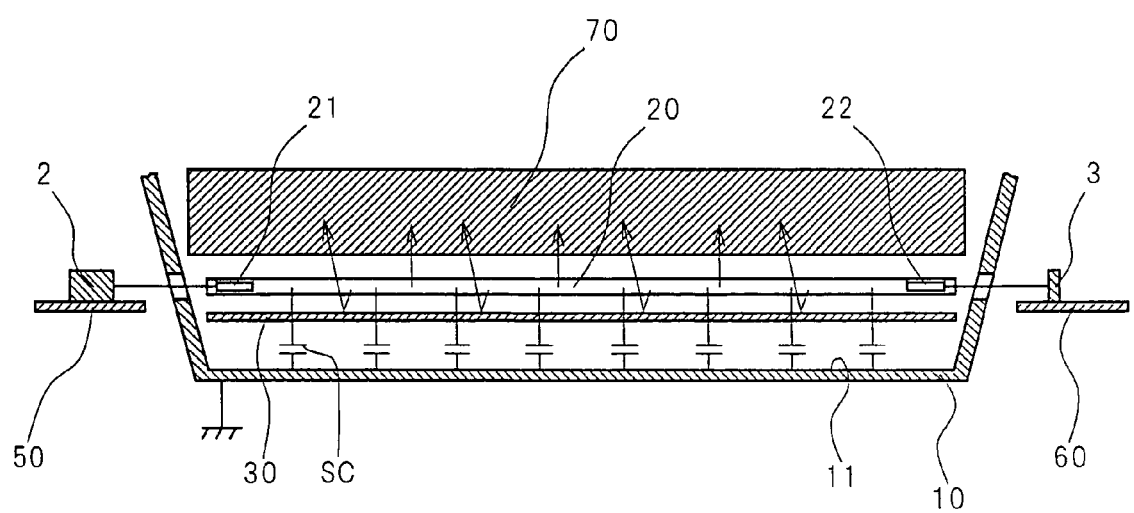
FIG. 2 is a sectional view of the liquid crystal display, taken along line II-II shown in FIG. 1.

FIG. 1 is a front view showing an internal part of a liquid crystal display provided with a cold-cathode tube lighting device according to a first preferred embodiment of the present invention. FIG. 2 is a sectional view of the liquid crystal display, taken along line II-II shown in FIG. 1 (the arrows shown in FIG. 1 show a visual line direction).

The liquid crystal display includes a case 10, a plurality of cold-cathode tubes 20, a reflecting plate 30, a first substrate 40, a second substrate 50, a third substrate 60, and a liquid crystal panel 70. The cold-cathode tube lighting device according to the first preferred embodiment of the present invention is mainly divided into two blocks 1 and 2, and the blocks 1 and 2 are mounted on the first substrate 40 and the second substrate 50, respectively.

The case 10 is, for example, a box made of metal, and the box 10 is grounded. The front side of the case 10 is open, and the reflecting plate 30, the cold-cathode tube 20, and the liquid crystal panel 70 (not shown in FIG. 1) are accommodated inside in this order from the rear. The cold-cathode tubes 20 include a plurality of cold-cathode tubes (for example, 16 cold cathode tubes). Each of the cold-cathode tubes 20 is held horizontally, and the cold-cathode tubes 20 are arranged at equal intervals in the vertical direction. The second substrate 50 and third substrate 60 are disposed on both sides of the case 10. Both ends of each of the cold-cathode tubes 20 are fixed to the second substrate 50 and the third substrate 60, respectively. An electrode 21 at one end of each of the cold-cathode tubes 20 is connected to the second block 2 of the cold-cathode tube lightening device. An electrode 22 at the other end of each of the cold-cathode tubes 20 is connected to a connection terminal 3 on the third substrate 60. The second block 2 and the connection terminal 3 are connected to the first block 1 on the first substrate 40 (the wirings therefor are not shown). The first substrate 40 is mounted at a location different from the case 10, for example, at a power source unit (not shown) of the liquid crystal display. The first block 1 is connected to the direct-current power source (not shown). The cold-cathode tube lighting device distributes the electric power supplied from the direct-current power source to each of the cold-cathode tubes 20 via the two blocks 1 and 2, and the connection terminal 3 so that each of the cold-cathode tubes 20 emits light. The light emitted from the cold-cathode tube 20 enters the liquid crystal panel 70 directly or after being reflected by the reflecting plate 30 (See arrows shown in FIG. 2). The liquid crystal panel 70 shields the incident light emitted from the cold-cathode tubes 20 using a predetermined pattern so as to display the pattern on the front face of the liquid crystal panel 70.

Figure 3:
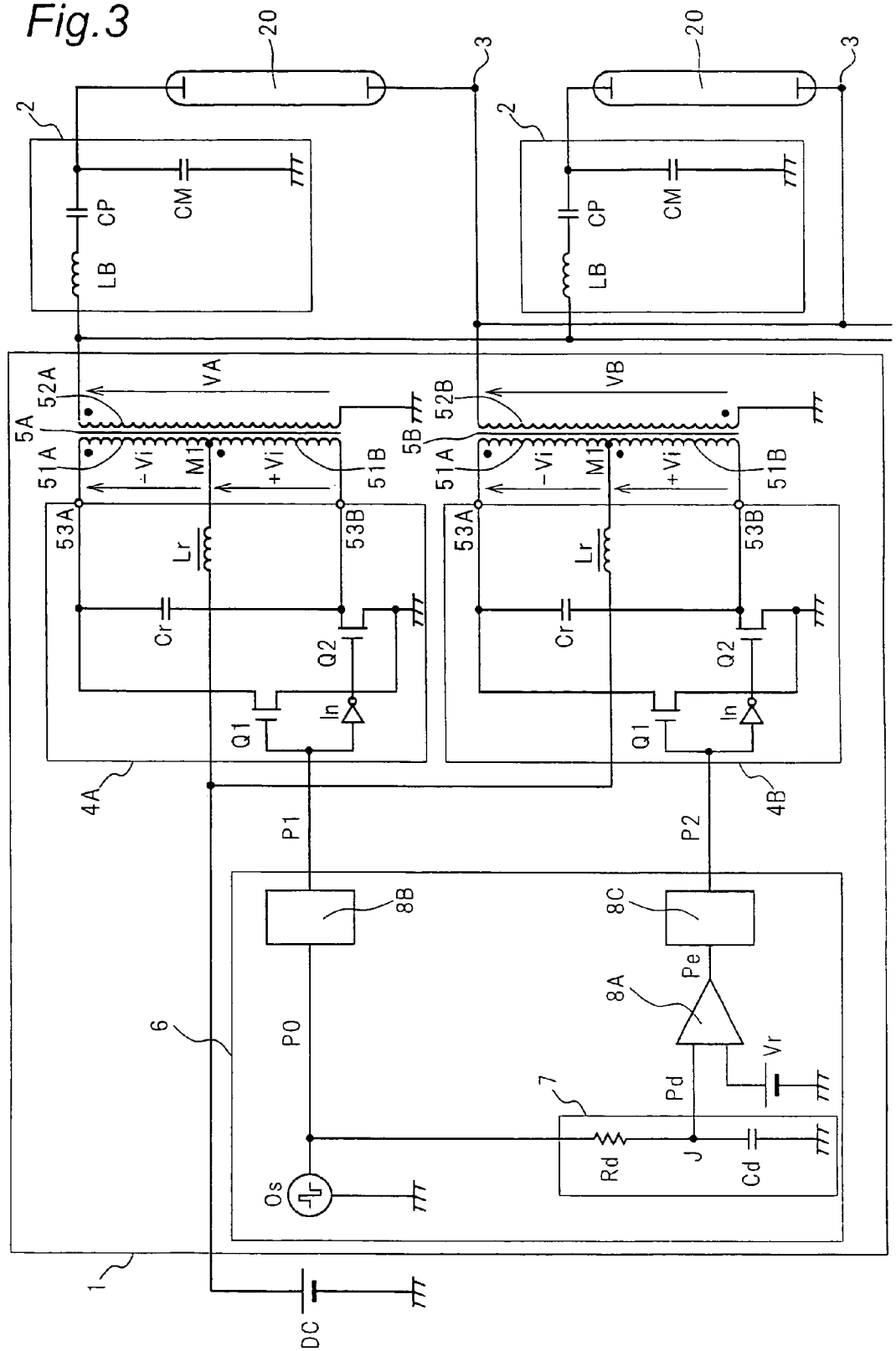
FIG. 3 is a circuit diagram showing a configuration of the cold-cathode tube lighting device according to the first preferred embodiment of the present invention.

FIG. 3 is a circuit diagram showing a configuration of the cold-cathode tube lighting device according to the first preferred embodiment of the present invention. The cold-cathode tube lighting device mainly includes the two blocks 1 and 2 described above.

The first block 1 includes a pair of high-frequency oscillator circuits 4A and 4B, a pair of step-up transformers 5A and 5B, and a phase correction circuit 6.

The high-frequency oscillator circuits 4A and 4B have configurations similar to each other, and each of the high-frequency oscillator circuits 4A and 4B includes an inductor Lr, a resonance capacitor Cr, a first transistor Q1, a second transistor Q2, and an inverter In.

The step-up transformers 5A and 5B has configurations similar to each other. A primary wingding of each of the step-up transformers 5A and 5B is divided into two primary windings 51A and 51B at the neutral point M1 thereof.

A positive electrode of the direct-current power source DC is connected to one terminal of the inductor Lr, and the negative electrode thereof is grounded. The other terminal of the inductor Lr is connected to the neutral point M1 of the primary windings 51A and 51B of the step-up transformer 5A (or 5B). The resonance capacitor Cr is connected across the other terminal 53A of the first primary winding 51A and the other terminal 53B of the second primary winding 51B. The terminal 53A of the first primary winding 51A is further connected to one terminal of the first transistor Q1. The terminal 53B of the second primary winding 51B is further connected to one terminal of the second transistor Q2. The other terminals of each of the first transistor Q1 and the second transistor Q2 are both grounded. In this case, the first transistor Q1 and the second transistor Q2 are preferably MOS FETs. In addition, they may also be IGBTs or bipolar transistors.

The phase correction circuit 6 includes an oscillator Os, a delay circuit 7, a comparator 8A, two flip-flops 8B and 8C, and a reference voltage source Vr.

The oscillator Os is connected to the first flip-flop 8B and the delay circuit 7 so as to send an original pulse signal P0 to them.

The first flip-flop 8B generates a first pulse signal P1 based on the original pulse signal P0. The first pulse signal P1 is sent to the first high-frequency oscillator circuit 4A. Then, the first pulse signal P1 is directly transmitted to a control terminal of the first transistor Q1, and the first pulse signal P1 is transmitted to a control terminal of the second transistor Q2 via the inverter In.

The delay circuit 7 generates a delay pulse signal Pd based on the original pulse signal P0. For example, the delay circuit 7 is a so-called RC filter, and the delay circuit 7 includes a series connection of a resistor Rd and a capacitor Cd. A terminal on the resistor Rd side of the series connection is connected to the oscillator Os, and a terminal on the capacitor Cd side thereof is grounded. The delay pulse signal Pd indicates a change in the electric potential at a connection point "J" between the resistor Rd and the capacitor Cd.

One of input terminals of the comparator 8A is connected to the connection point "J" of the resistor Rd and the capacitor Cd, and the other input terminal of the comparator 8A is connected to a positive electrode of the reference voltage source Vr. A negative electrode of the reference voltage source Vr is grounded. An output terminal of the comparator 8A is connected to the second flip-flop 8C. The comparator 8A compares a level of the delay pulse signal Pd to a voltage of the reference voltage source Vr and, indicates a comparison result with a level of an output Pe.

The second flip-flop 8C generates a second pulse signal P2 based on the output Pe from the comparator 8A. The second pulse signal P2 is sent to the second high-frequency oscillator circuit 4B. Then, the second pulse signal P2 is directly transmitted to the control terminal of the first transistor Q1, and the second pulse signal P2 is transmitted to the control terminal of the second transistor Q2 via the inverter In.

Figure 4:
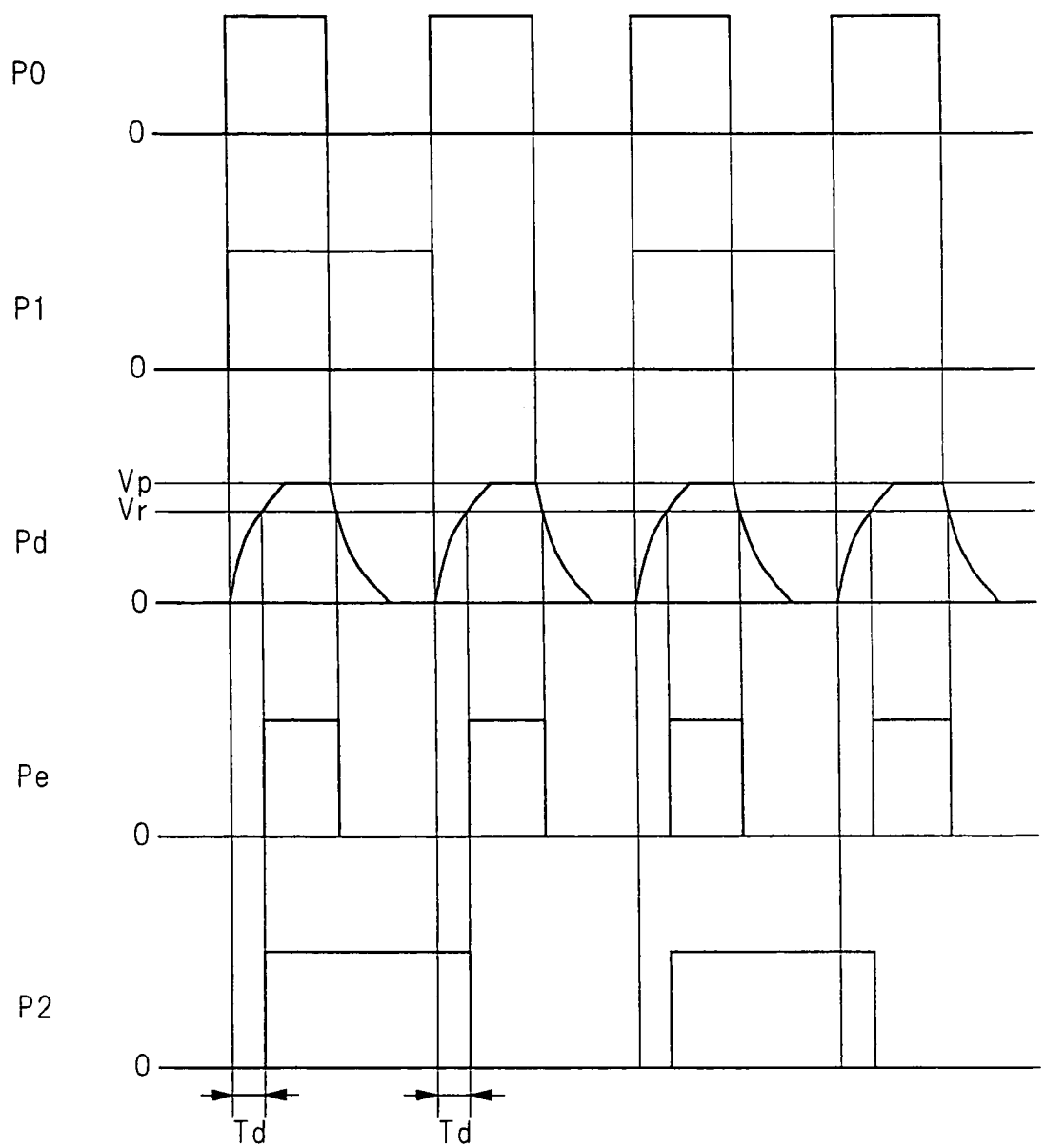
FIG. 4 is a wave form chart showing an original pulse signal P0, a first pulse signal P1, a delay pulse signal Pd, output Pe of a comparator 8A, and a second pulse signal P2 for the cold-cathode tube lighting device according to the first preferred embodiment of the present invention.

FIG. 4 is a wave form chart showing the original pulse signal P0, the first pulse signal P1, the delay pulse signal Pd, the output Pe of the comparator 8A, and the second pulse signal P2.

The original pulse signal P0 is a square pulse signal, and has a constant frequency (for example, 90 [kHz]), a constant pulse width, and a constant pulse height.

The first flip-flop 8B synchronizes risings and fallings of the first pulse signal P1 to risings of the first pulse signal P0 so as to generate the first pulse signal P1 of a square pulse signal similar to the original pulse signal P0. In particular, a frequency of the first pulse signal P1 is ½ times (for example, 45 [kHz]) a frequency of the original pulse signal P0, and a duty of the first pulse signal P1 is 50%.

The delay pulse signal Pd is in phase with the original pulse signal P0. However, a rise time and a decay time of the delay pulse signal Pd is longer than a rise time and a decay time of the original pulse signal P0, respectively.

When the level of the delay pulse signal Pd is lower than the reference voltage Vr, the output Pe from the comparator 8A is maintained at a constant low level. On the other hand, when the level of the delay pulse signal Pd is higher than the reference voltage Vr, the output Pe from the comparator 8A is maintained at a constant high level.

The second flip-flop 8C synchronizes risings and fallings of the second pulse signal P2 to risings of the output Pe from the comparator 8A so as to generate the second pulse signal P2 of a square pulse signal similar to the first pulse signal P1. Namely, a frequency of the second pulse signal P2 is equal to the frequency of the first pulse signal P1 (for example, 45 [kHz]). Further, a duty of the second pulse signal is 50%. However, the risings of the second pulse signal P2 are delayed by a constant delay time Td from the risings of the first pulse signal P1. The delay time Td is determined by a time constant (a product of a resistance value "R" of the resistor Rd and a capacity "C" of the capacitor Cd) of the delay circuit 7, a pulse height Vp of the delay pulse signal Pd, and the reference voltage Vr by the following equation: $Td=-RC \times \ln(1-Vr/Vp)$.

The direct-current power source DC maintains its output voltage Vi at a constant value (for example, 16[V]).

In the first high-frequency oscillator circuit 4A, the first pulse signal P1 is applied to the control terminal of the first transistor Q1 in the original polarity, and the first pulse signal P1 is applied to the control terminal of the second transistor Q2 with the polarity inverted by the inverter In.

In the second high-frequency oscillator circuit 4B, the second pulse signal P2 is applied to the control terminal of the first transistor Q1 in the original polarity, and is applied to the control terminal of the second transistor Q2 with the polarity inverted by the inverter In.

In this case, in each of the high-frequency oscillator circuits 4A and 4B, the two transistors Q1, Q2 are turned on and off alternately at ½ times the frequency of the oscillator OS (for example, 45 [kHz]). Further, on-duties of the two transistors Q1 and Q2 are both equal to 50%. As a result, in each of the step-up transformers 5A and 5B, the input voltage Vi is alternately applied to the two primary windings 51A and 51B. The inductor Lr and the resonance capacitor Cr cause resonance at each application of the voltage, and polarities of secondary voltage VA and VB of each of the step-up transformers 5A and 5B are inverted at ½ times the frequency of the oscillator Os.

In the manner as described above, the first block 1 converts the output voltage Vi from the direct-current power source DC into alternating-voltages VA and VB, each having a high frequency (for example, 45 [kHz]). The high frequency is referred to as a drive frequency of the cold-cathode tube 20 below.

In the cold-cathode tube lighting device according to the first preferred embodiment of the present invention, the leakage flux of each of the step-up transformers 5A and 5B described above is suppressed to be small as described below, contrary to the presumption in the device according to the prior art. Accordingly, the first block 1 functions as a pair of power sources each having a low output impedance, that is, a pair of low-impedance power sources.

Figure 5:
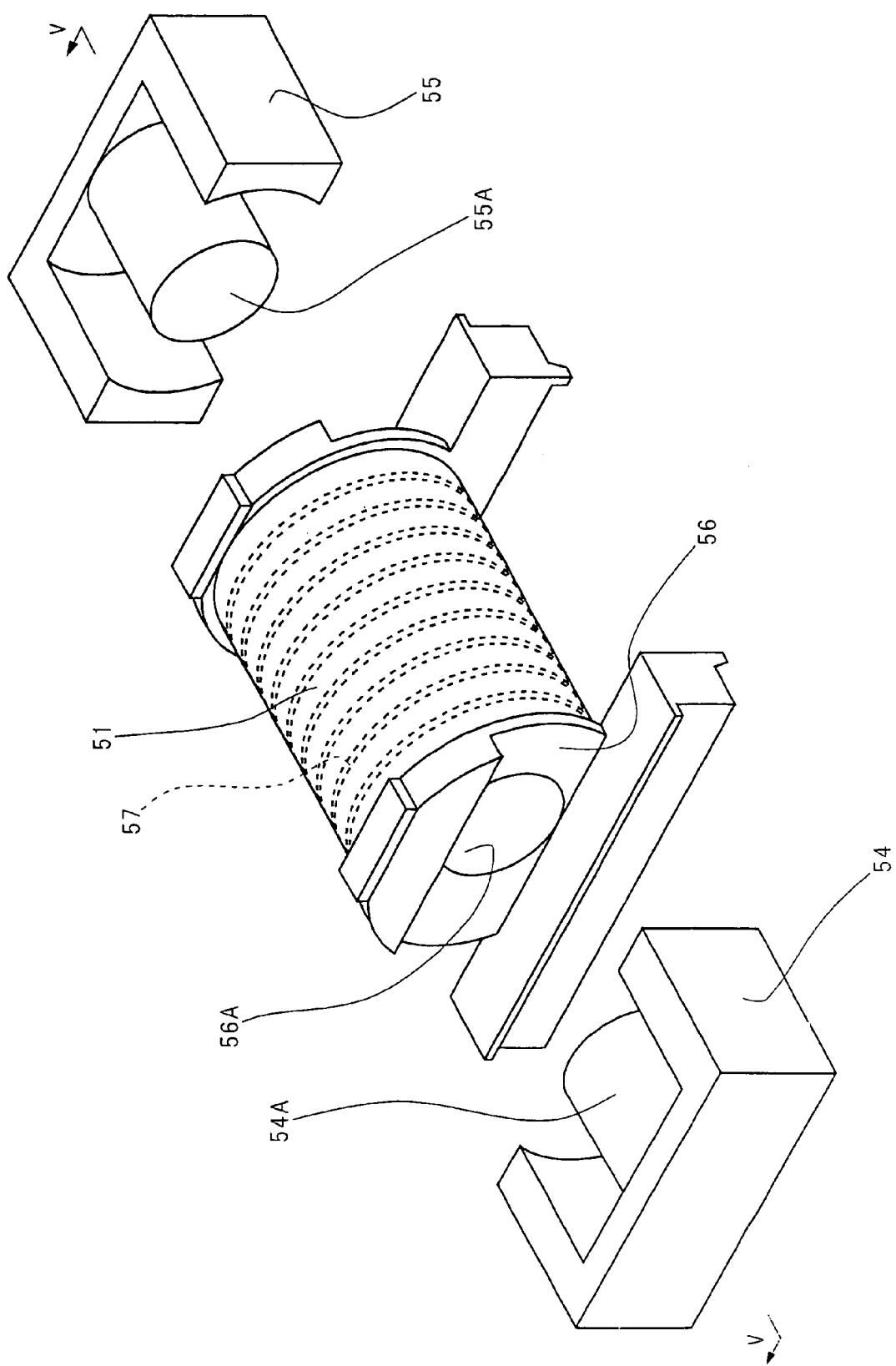
FIG. 5 is an exploded view schematically showing a configuration of a step-up transformer 5 adopted in the cold-cathode tube lighting device according to the first preferred embodiment of the present invention.
Figure 6:
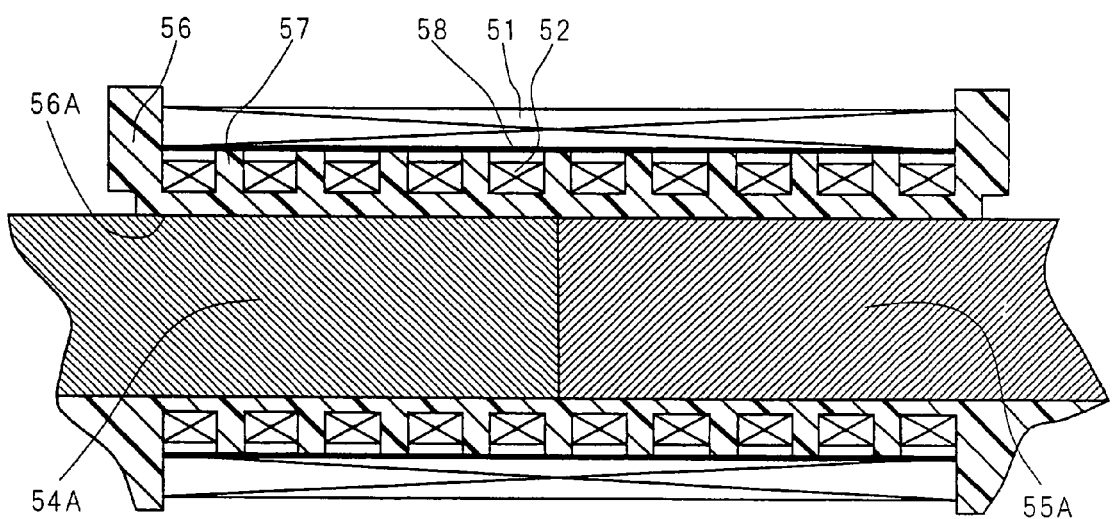
FIG. 6 is a sectional view of the step-up transformer 5, taken along line VI-VI shown in FIG. 5.

FIG. 5 is an exploded view schematically showing a configuration of the step-up transformer 5 adopted in the cold-cathode tube lighting device according to the first preferred embodiment of the present invention. FIG. 6 is a sectional view of the step-up transformer 5, taken along line VI-VI shown in FIG. 5 (the arrows shown in FIG. 5 show a visual line direction)

The step-up transformer 5 includes a primary winding 51 (a combination of the two primary windings 51A and 51B described above), the secondary winding 52, two E-shaped cores 54 and 55, a bobbin 56, and an insulating tape 58. The bobbin 56 is made of a synthetic resin, for example, and has the shape of a hollow cylinder. The respective central protrusions 54A and 55A of the E-shaped cores 54 and 55 are inserted into a hollow part 56A of the bobbin 56, through openings on both sides of the bobbin 56. On the outer circumferential face of the bobbin 56, multiple partitions 57 are provided at equal intervals in the axial direction. First, the secondary winding 52 is wound between the partitions 57. Next, the insulating tape 58 is wound around the outside of the secondary winding 52. Finally, the primary winding 51 is wound around the outside of the insulating tape 58. In this case, the secondary winding 52 may also be wound around the outside of the primary winding 51 or around both the inside and outside of the primary winding 51. Leakage flux is reduced significantly by winding the primary winding 51 and the secondary winding 52 so as to be overlaid as described above. Accordingly, an output impedance of the step-up transformer 5 is low. In particular, the output impedance is set so as to be lower than a combined impedance of all of the plurality of cold-cathode tubes 20 connected in parallel to each other (See FIG. 3).

In the step-up transformer 5 described above, the secondary winding 52 is wound by division winding as described above. In addition, the secondary winding 52 may also be wound by honeycomb winding so as to prevent the discharge between the windings, and to suppress small the capacitance between the wires. Accordingly, a self-resonant frequency of the secondary winding 52 can be set to be sufficiently high.

Each second block 2 is connected to each cold-cathode tube 20, and includes a series connection of a ballast inductor LB, an overcurrent protection capacitor CP, and a matching capacitor CM.

One terminals of the respective secondary windings 52A and 52B of the two step-up transformers 5A and 5B are grounded so that their polarities are opposite to each other. The other terminal of the secondary winding 52A of the first step-up transformer 5A is connected to one terminal of a series connection of the ballast inductor LB and the overcurrent protection capacitor CP. The other terminal of the series connection is connected to one terminal of the matching capacitor CM and the electrode at one terminal of the cold-cathode tube 20. The other terminal of the matching capacitor CM is grounded. The electrode at the other terminal of the cold-cathode tube 20 is connected to the other terminal of the secondary winding 52B of the second step-up transformer 5B via the connection terminal 3.

The ballast inductor LB is for example, a winding coil. The inductance thereof is for example, 450 [mH]. The winding of the ballast inductor LB is wound by a sectional winding (or a honeycomb winding) in a manner similar to the secondary winding 52 of the step-up transformer 5 (See FIGS. 5 and 6). With this configuration, since the capacitance between the wires is reduced, a self-resonant frequency of the secondary winding is sufficiently high. The self-resonance frequency is preferably sufficiently higher than the drive frequency of the cold-cathode tube 20.

Further, the ballast inductor LB preferably includes a saturable reactor. Accordingly, when the electric discharge in the cold-cathode tube 20 is suddenly interrupted, and a voltage across both ends of the cold-cathode tube 20 is drastically increased, the inductance of the ballast inductor LB is saturated so that further increase in the voltage is suppressed. Accordingly, the cold-cathode tube 20 and the cold-cathode tube lighting device are protected from over voltage.

The overcurrent protection capacitor CP functions as a buffer in short-circuit of the ballast inductor LB so as to protect the cold-cathode tube 20 from the overcurrent. The capacity of the overcurrent protection capacitor CP is set to, for example, about 150 [pF]. In this case, when the possibility of occurrence of the overcurrent is small, the overcurrent protection capacitor CP may not be arranged.

An impedance of the series connection of the ballast inductor LB and the overcurrent protection capacitor CB is sufficiently higher than an output impedance of the first block 1. Accordingly, in the cold-cathode tube lighting device according to the first preferred embodiment of the present invention, when the impedance of the series connection of the ballast inductor LB and the overcurrent protection capacitor CB matches with the impedance of the cold-cathode tube 20, efficiency is high. Further, when the impedance matching is achieved at each of the cold-cathode tubes 20, the tube currents during lighting are uniformly maintained among the plurality of cold-cathode tubes 20. That is, the plurality of cold-cathode tubes 20 is uniformly lit with using a common power source (first block 1).

However, various stray capacitances are present (not shown) in the periphery of each of the cold-cathode tubes 20. The stray capacitances include the stray capacitance SC between the cold-cathode tubes 20 and the case 10 (See FIG. 2), and the stray capacitances of the wires connecting the first block 1, the second block 2, the third block 3, the cold-cathode tube 20, and the grounding conductor, for example. Accordingly, the stray capacitances in the periphery of the cold-cathode tubes 20 are different from each other for each of the cold-cathode tubes 20. Therefore, impedances of the cold-cathode tubes 20 are different from each other.

The capacity of the matching capacitor CM is, for example, about 20 [pF], and is set for each second block 2. In particular, the difference in the capacity of the matching CM among the second blocks 2 cancels out the difference in the stray capacitance among the plurality of cold-cathode tubes 20. For example, since the stray capacitance generally becomes larger as the wire becomes longer, the capacity is set to be smaller especially for the matching capacitor CM connected to the cold-cathode tube 20 distant from the step-up transformer 5. Thus, a combined impedance of the matching capacitor CM and the peripheral stray capacitance substantially coincide among the plurality of cold-cathode tubes 20.

Under such coinciding, the impedances of the matching capacitor CM, the ballast inductor LB, and the overcurrent protection capacitor CP are adjusted, respectively, so that, for each of the cold-cathode tubes 20, the combined impedance of the matching capacitor CM and the peripheral stray capacitance matches with the impedance of the series connection of the ballast inductor LB and the overcurrent protection capacitor CP. Further preferably, each of the combined impedances is set so as to be matched with the impedance (for example, 200 [kΩ]) of each of the cold-cathode tubes 20 during lighting.

Thus, the above-described impedance matching is realized in each of the cold-cathode tubes 20. As a result, tube currents during lighting are maintained to be uniform among the cold-cathode tubes 20. Thus, the plurality of cold-cathode tubes 20 are lit at uniform luminance. Further, the efficiency is high.

In the above described example, the impedance of each matching capacitor CM is separately set so as to cancel out the difference in the stray capacitance among the plurality of cold-cathode tubes 20. Instead of or in addition to the impedance of the matching capacitor CM, the impedance of each ballast inductor LB may be separately set so as to cancel out the difference in the stray capacitance among the plurality of cold-cathode tubes 20.

Due to the impedance matching described above, during lighting of the cold-cathode tubes 20, effective values of the tube currents are maintained to be substantially uniform among the cold-cathode tubes 20. This is understood in the following way.

Figure 7:
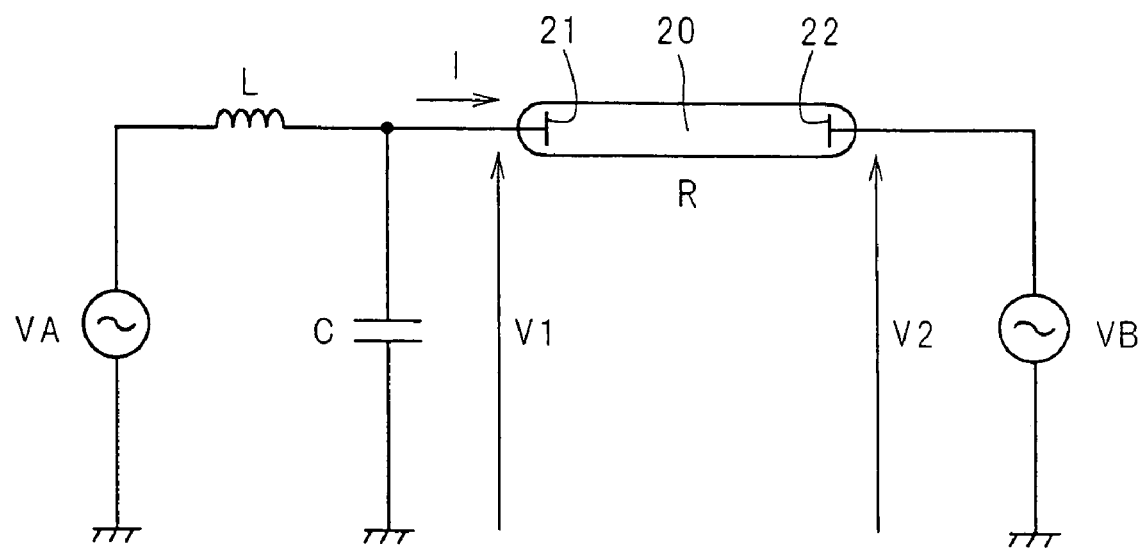
FIG. 7 is a schematic view showing an equivalent circuit on the secondary side of each of step-up transformers 5A and 5B for the cold-cathode tube lighting device according to the first preferred embodiment of the present invention.

FIG. 7 is a schematic view showing an equivalent circuit on the secondary side of each of the step-up transformers 5A and 5B.

Each of the step-up transformers 5A and 5B is recognized as an alternating-current voltage source having a low output impedance, since leakage flux thereof is small. Further, among the plurality of cold-cathode tubes 20, an inductance "L" of the ballast inductor LB, and a combined capacity "C" of the matching capacitor CM and the peripheral stray capacitance are common. Accordingly, the fact that the effective value of the tube current substantially does not depend on the impedance of the cold-cathode tube 20 should simply be understood for one of the cold-cathode tubes 20.

In this case, since the capacity of the overcurrent protection capacitor CP is sufficiently larger than the capacity of the matching capacitor CM and the stray capacitance in the periphery of the cold-cathode tube 20, the capacity of the overcurrent protection capacitor CP can be ignored in the following explanation.

It is assumed that the tube current is "I", and the frequency common to the secondary voltages VA and VB, that is, the drive frequency of the cold-cathode tube 20 is "ω". An electric potential V1 at the electrode 21 (referred to as a first electrode hereinafter) of the cold-cathode tube 20 connected to the second block 2 is expressed by the following equation (1):

$$V1 = (VA - j\omega L1)/(1 - \omega^2 LC). \tag{1}$$

From the equation (1), a ratio of the secondary voltage VA to the tube current "I" of the first step-up transformer 51A satisfies the following equation (2):

$$VA/I = (1 - \omega^2 LC)V1/I + j\omega L. \tag{2}$$

On the other hand, the electric potential V2 at the other electrode 22 (referred to as a second electrode hereinafter) of the cold-cathode tube 20 is equal to the secondary voltage VB of the second step-up transformer 5B.

A voltage VF=V1−V2 across both ends of the cold-cathode tube 20 is equal to a product of an impedance "R" and the tube current "I" of the cold-cathode tube 20: V1−V2=RI.

The secondary voltage VA of the first step-up transformer 51A is set in the following way so that the electrode voltages V1 and V2 at both ends of the cold-cathode tube 20 vary so as to be the same amplitude and opposite to each other in phase: V1=−V2. In this case, V1/I is equal to R/2. Accordingly, the equation (2) can be re-written as the following equation (3):

$$VA/I=(1-\omega^2 LC)R/2+j\omega L. \quad (3)$$

The impedance of the ballast inductor LB matches with the impedance of the above-mentioned combined capacity: $\omega L \approx 1/\omega C$. In this case, since the first term on the right side of equation (3) is canceled out substantially, the ratio of the secondary voltage VA to the tube current "I" of the first step-up transformer 51A is expressed by the following equation (4), substantially:

$$VA/I \approx 1/j\omega L. \quad (4)$$

Namely, the tube current "I" is determined substantially by parameters common to the plurality of cold-cathode tubes 20, that is, the secondary voltage VA of the first step-up transformer 5A, the inductance "L" of the ballast inductor LB, and the drive frequency ω of the cold-cathode tube 20. In particular, the tube current "I" substantially does not depend on the impedance "R" of the cold-cathode tube 20.

Thus, the tube current "I" during lighting is uniformly maintained among the plurality of cold-cathode tubes 20. Accordingly, the plurality of cold-cathode tubes 20 emit light at uniform luminance.

From the point of view of the present invention of maintaining the luminance uniformly among the plurality of cold-cathode tubes 20, the impedance of the ballast inductor LB should be strictly matched with the combined impedance of the matching capacitor CM and the peripheral stray capacitance, as mentioned above. Namely, the drive frequency ω of the cold-cathode tube 20 should strictly coincide with the resonance frequency between the ballast inductor LB and the above-mentioned combined capacity: $\omega \approx \omega c = 1/(LC)^{1/2}$.

However, in practice, too strict coinciding between the drive frequency ω of the cold-cathode tube 20 and the resonance frequency ωc is sometimes not preferable from a point of view different from the point of view of the present invention. For example, the amplitude of the tube current is excessively amplified, and the stability of the amplitude of the tube current is lowered. As a result, flickering of the cold-cathode tube 20 may become excess.

In order to avoid such state, the drive frequency ω of the cold-cathode tube 20 is preferably set to be slightly shifted from the resonance frequency ωc. In this case, the difference between the drive frequency ω and the resonance frequency ωc is adjusted within a range the uniformity of the luminance among the plurality of cold-cathode tubes 20 is sufficiently maintained. Thus, the tube current substantially uniform among the plurality of cold-cathode tubes 20 is maintained stably.

During the time when the cold-cathode tube 20 is off, the ballast inductor LB further functions in the following way.

Figure 8:
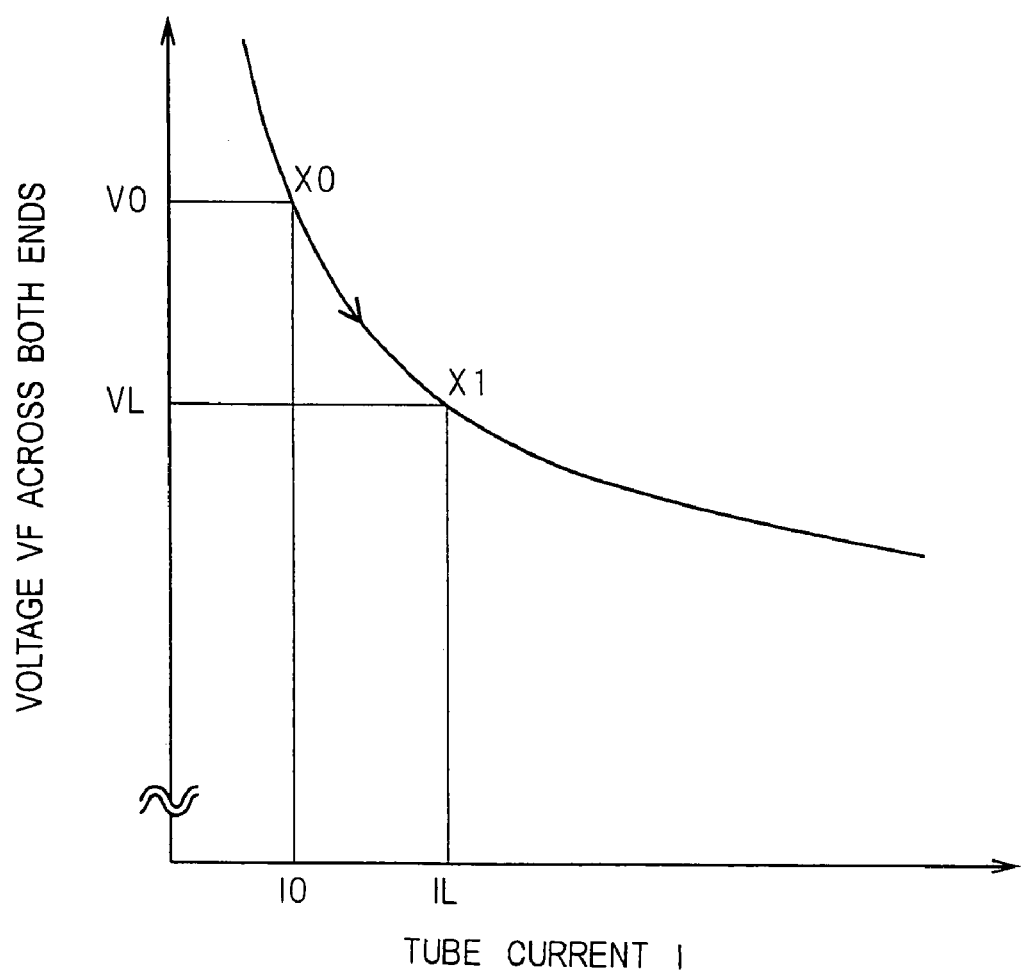
FIG. 8 is a graph showing a voltage-current property of a cold-cathode tube 20 for the cold-cathode tube lighting device according to the first preferred embodiment of the present invention.

FIG. 8 is a graph showing a voltage-current property of the cold-cathode tube 20. The vertical axis indicates the voltage (effective value thereof) VF across both ends of the cold-cathode tube 20, and the transverse axis indicates the tube current (effective value thereof) "I". The voltage VF across both ends of the cold-cathode tube 20 becomes lower as the tube current "I" becomes larger due to the negative resistance property of the cold-cathode tube 20.

During the time when the cold-cathode tube 20 is off, the tube current "I" is a very small value 10. In this state, the secondary voltages VA and VB are applied to the cold-cathode tube 20 by the step-up transformers 5A and 5B. At that time, since the space between the electrodes 21 and 22 at both ends of the cold-cathode tube 20 is substantially opened, the ballast inductor LB mainly resonates with the matching capacitor CM. Due to the resonance, the voltage VF across both ends of the cold-cathode tube 20 increases to a value greater than or equal to an firing potential V0 (for example, 2000[V] to 2500[V]) (See a point X0 shown in FIG. 8). Accordingly, electric discharge starts between the electrodes 21, 22 at both ends of the cold-cathode tube 20, and the tube current "I" increases. Along with the increase in the tube current "I", the voltage VF across both ends of the cold-cathode tube 20 drops from the firing potential V0 (See an arrow shown in FIG. 8), and then, the voltage VF is maintained stably (See point X1 shown in FIG. 8) near a lamp voltage VL (for example, 1500[V]) of the cold-cathode tube 20. At that time, the tube current "I" is maintained stably at a constant value IL (for example, 4 [mA]).

In each of the cold-cathode tubes 20, the leakage current flows between the tube wall thereof and the external. In order to raise the uniformity of the luminance in the longitudinal direction of the cold-cathode tube 20, the leakage current is preferably distributed symmetrical with respect to the central part of the cold-cathode tube 20.

Then, the secondary voltages VA and VB of the step-up transformers 5A and 5B are set in the following manner, so that, in each of the cold-cathode tubes 20, the intermediate point of the electrode potentials at both ends is maintained at high precision to be equal to the ground potential. Namely, the electrode potentials V1 and V2 at both ends are maintained asymmetrically with respect to the ground potential: V1=−V2. In this case, the distribution of the leakage current is symmetrical with respect to the central part of the cold-cathode tube 20.

The polarity of the secondary winding 52A of the step-up transformer 5A is the reverse of the polarity of the secondary winding 52B of the step-up transformer 5B. Further, a constant phase difference δ corresponding to the delay time Td is set between the first pulse signal P1 and the second pulse signal P2 (See FIG. 4). Accordingly, the phase of the secondary voltage VB of the second step-up transformer 5B is delayed from the phase of the secondary voltage VA of the first step-up transformer 5A by π+δ[rad]=180+Γ[deg]. Thus, the secondary voltage VA of the step-up transformer 5A, the secondary voltage VB of the step-up transformer 5B, and the electric potential V2 at the second electrode 22 are expressed by the following equations (5), (6), and (7):

$$VA = VAe \times \exp(j\omega t); \quad (5)$$

$$VB = VBe \times \exp(j(\omega t - (\pi+\delta))); \text{ and} \quad (6)$$

$$V2 = VB = VBe \times \exp(j(\omega t - (\pi+\delta))). \quad (7)$$

In this case, it is assumed that effective values of the respective secondary voltages VA and VB are VAe and VBe, and a time variable is "t".

The condition (V1=−V2) to maintain asymmetrically the voltage V1 at the first electrode 21 and the voltage V2 at the second electrode 22 with respect to the ground potential is divided into the following two conditions. The first condition is such a condition in which the amplitudes (therefore, the effective values) of both electric potentials V1 and V2 are equal (See the following equation (8)) to each other. In this case, the effective values of the electric potentials V1 and V2 are, for example, set to be equal to half value VL/2 of the lamp voltage (the effective value) VL of the cold-cathode tube 20. The second condition is such a condition in which the phase difference between the electric potentials V1 and V2 is maintained to π[rad]=180° (See the following equation (9)):

$$|V1|=|V2|=VL/2; \text{ and} \quad (8)$$

$$arg(V1)-arg(V2)=\pi. \quad (9)$$

As apparent from the equations (7) and (8), the effective value VBe of the secondary voltage VB of the second step-up transformer 5B is set to be equal to the half value VL/2 of the lamp voltage VL of the cold-cathode tube 20. For example, when the lamp voltage VL of the cold-cathode tube 20 is set to 1500[V], the effective value VBe of the secondary voltage VB of the second step-up transformer 5B is set to 750[V].

Further, since the phase arg(V2) of the electric potential V2 at the second electrode 22 is −(π+δ)[rad] from the equation (7), the phase arg(V1) of the electric potential V1 at the first electrode 21 is equal to −δ[rad] from the equation (9).

Accordingly, when conditions (8) and (9) are satisfied, the electric potential V1 at the first electrode 21 and the electric potential V2 at the second electrode 22 are expressed by the following equations (10) and (11), respectively:

$$V1=(VL/2)\times\exp(j(\omega t-\delta)); \text{ and} \quad (10)$$

$$V2=-(VL/2)\times\exp(j(\omega t-\delta)). \quad (11)$$

From the equations (10) and (11), the phase of the voltage VF=V1−V2 across both ends of the cold-cathode tube 20 is equal to −δ [rad].

On the other hand, the voltage VF=V1−V2 across both ends of the cold-cathode tube 20 is equal to a product of the impedance "R" and the tube current "I" of the cold-cathode tube 20: VF=RI. When the reactance of the impedance "R" of the cold-cathode tube 20 is ignored, the voltage VF across both ends of the cold-cathode tube 20 and the tube current "I" are in phase. Accordingly, the phase of the tube current is equal to −δ [rad]. As a result, when the effective value of the tube current "I" is Ie, the tube current "I" is expressed by the following equation (12):

$$I=Ie\times\exp(j(\omega t-\delta)). \quad (12)$$

When substituting the equations (5), (10), and (12) to the equation (1), the secondary voltage VA of the step-up transformer 5A, the secondary voltage VB of the step-up transformer 5B, and the shift δ [rad] of the phase difference between the secondary voltages VA and VB from the opposite phase π[rad] are set according to the following equations (13), (14), and (15), respectively:

$$Vae=\{(1-\omega^2 LC)^2(VL/2)^2+(\omega LIe)^2\}^{1/2}; \quad (13)$$

$$VBe=VL/2; \text{ and} \quad (14)$$

$$\delta=\tan^{-1}\{2\omega LIe/(1-\omega^2 LC)VL\}. \quad (15)$$

Figure 9:
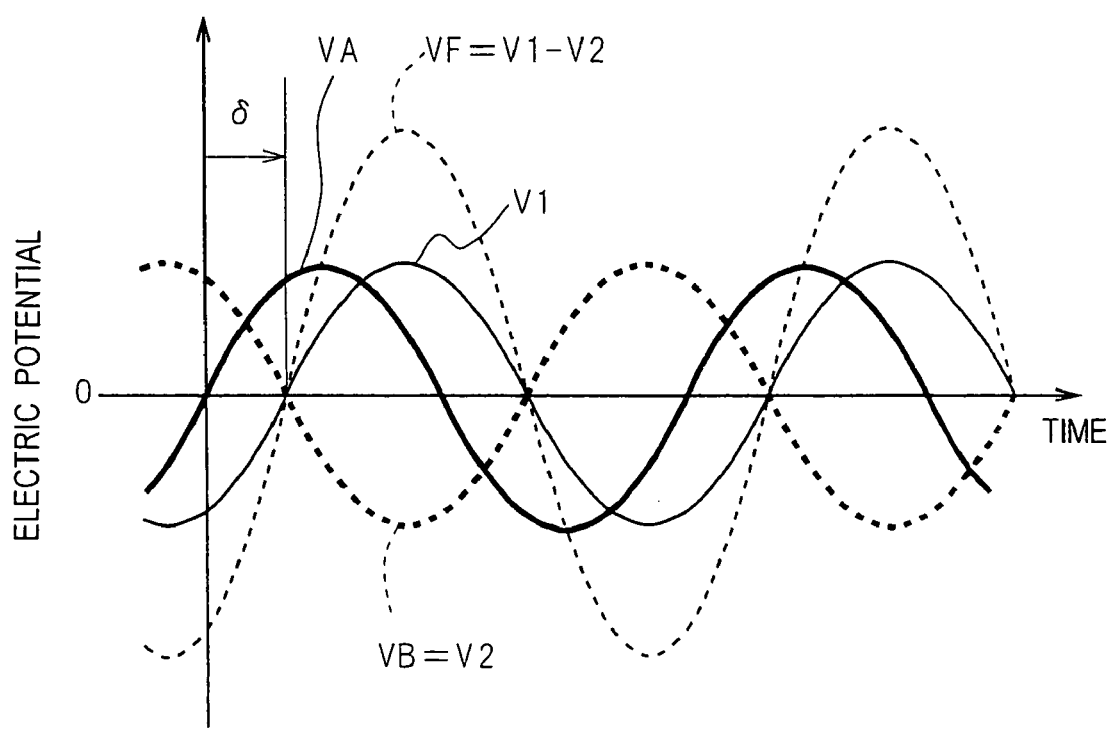
FIG. 9 is a wave form chart showing each of changes in a secondary voltage VA of the step-up transformers 5A, a secondary voltage VB of the step-up transformers 5B, an electric potential V1 at a first electrode 21 of the cold-cathode tube 20, and a voltage VF across both ends of the cold-cathode tube 20 for the cold-cathode tube lighting device according to the first preferred embodiment of the present invention.

FIG. 9 is a wave form chart showing each of changes in the secondary voltage VA of the step-up transformers 5A, the secondary voltage VB of the step-up transformers 5B, the electric potential V1 at the first electrode 21 of the cold-cathode tube 20, and the voltage VF=V1−V2=V1−VB across both ends of the cold-cathode tube 20. In FIG. 9, the vertical axis indicates the electric potential with respect to the ground potential, and the transverse axis indicates time. Further, the thick solid line shows the secondary voltage VA of the first step-up transformer 5A, the thick broken line shows the secondary voltage VB (=the electric potential V2 at the second electrode 22) of the second step-up transformer 5B, the thin solid line shows the electric potential V1 at the first electrode 21, and the thin broken line shows the voltage VF=V1−Vb across both ends of the cold-cathode tube 20.

Based on the above-mentioned equation (13), the effective value of the secondary voltage VA of the first step-up transformer 5A is set to be lower than the effective value (=the half value VL/2 of the lamp voltage) of the secondary voltage VB of the second step-up transformer 5B. Further, based on the above-mentioned equation (15), the phase of the secondary voltage VB of the second step-up transformer 5B is delayed from the phase of the secondary voltage VA of the first step-up transformer 5A by π+δ [rad]=180+δ [deg].

For example, when the inductance "L" of the ballast inductor LB is set to 450 [mH], the combined capacity "C" of the matching capacitor CM and the peripheral stray capacitance is set to 23 [pF], the lamp voltage VL of the cold-cathode tube 20 is set to 1500[V], and the effective value Ie of the tube current "I" is set to 5 [mA], the effective value VAe of the secondary voltage VA of the first step-up transformer 5A is set to 650[V], and the effective value VBe of the secondary voltage VB of the second step-up transformer 5B is set to 750[V]. Further, the shift δ[rad] of the phase difference between the secondary voltages VA and VB from the opposite phase π[rad] is set to 1.47[rad]=84°. Namely, the above-mentioned delay time Td (See FIG. 4) by the delay circuit 7 is set to 5.2 [μsec].

By virtue of the above-mentioned settings, the electric potential V1 at the first electrode 21 and the electric potential V2 (=the secondary voltage VB of the second step-up transformer 5B) at the second electrode 22 vary uniformly, while they are maintained asymmetrically with respect to the ground potential (=0), as shown in FIG. 9. Further, the voltage VF=V1−V2 across both ends of the cold-cathode tube 20 changes in opposite phase with respect to the secondary voltage VB of the second step-up transformer 5B, and the effective value thereof is maintained substantially equal to the lamp voltage VL of the cold-cathode tube 20.

Thus, the electrode potentials V1 and V2 at both ends of each of the cold-cathode tubes 20 vary uniformly, while they are maintained asymmetrically with respect to the ground potential. Accordingly, in each of the cold-cathode tubes 20, the distribution of the leakage current flowing between each part of the tube wall and the external is symmetrical with respect to the central part of the cold-cathode tube 20. Accordingly, in each of the cold-cathode tubes 20, the imbalance in luminance in the longitudinal direction of each of the cold-cathode tubes 20 is reduced, and this leads to the improved uniformity.

In the cold-cathode tube lighting device according to the first preferred embodiment of the present invention, the leakage flux of the step-up transformers 5A and 5B are suppressed, contrary to the presumption in the device according to the prior art. Instead, one ballast inductor LB and one matching capacitor CM are connected to each of the cold-cathode tubes 20. In particular, the impedances of them are set independently so as to cancel out the differences of the peripheral stray capacitances among the plurality of cold-cathode tubes 20. Accordingly, since no variation occurs in tube current among the plurality of cold-cathode tubes 20, the luminance is maintained uniformly and stably. Thus, the cold-cathode tube lighting device according to the first preferred embodiment of the present invention uniformly and stably lights the plurality of cold-cathode tubes 20 using the common low-impedance power source (first block) 1. In addition, since the wires connected between the first block 1 and the second block 2 may be long and may be different significantly for each of the cold-cathode tubes 20, the layout of the wiring is high in flexibility. Accordingly, the downsizing of the whole device is realized easily.

Further, in the cold-cathode tube lighting device according to the first preferred embodiment of the present invention, the phase correction circuit 6 maintains the phase difference between the electrode potentials V1 and V2 at both ends of the cold-cathode tube 20 equal to π[rad]=180° at high precision. Thus, in each of the cold-cathode tubes 20, the electrode potentials V1 and V2 at both ends of the cold-cathode tubes 20 are maintained asymmetrically with respect to the ground potential. Accordingly, each of the cold-cathode tubes 20 entirely emits light at uniform luminance.

In addition, by using the two step-up transformers 5A and 5B obtained by dividing a step-up transformer, withstand voltages of the circuit elements connected to the step-up transformers 5A and 5B can be reduced by half compared to those when one step-up transformer is used. In particular, the withstand voltage of the step-up transformer itself is reduced by half. Accordingly, since it is significantly possible to realize the downsizing of the step-up transformer, the downsizing of the cold-cathode tube lighting device according to the first preferred embodiment of the present invention is easily realized.

In the cold-cathode tube lighting device according to the first preferred embodiment of the present invention, the fluctuation of the operating state of each of the cold-cathode tubes 20 is absorbed by each ballast inductor LB. Accordingly, the phase difference between the secondary voltage VA of the step-up transformer 5A and the secondary voltage VB of the step-up transformer 5B is hardly affected by the variations in the operating state among the plurality of cold-cathode tubes 20. Accordingly, the phase difference simply needs to be maintained substantially at a constant quantity for all the cold-cathode tubes 20. The phase correction circuit 6 easily maintains the above-mentioned phase difference to be equal to the constant quantity 180+δ[deg] using the delay circuit 7.

In addition, the phase correction circuit may calculate the secondary voltages VA and VB of the step-up transformers 5A and 5B and the phase difference 180+δ[deg] between the secondary voltages VA and VB, based on the actual operating state of the cold-cathode tube 20 and the like with a logic circuit such as a CPU. Instead, the phase correction circuit may store the table of the secondary voltages VA and VB of the step-up transformers 5A and 5B and the phase difference 180+δ[deg] between the secondary voltages VA and VB, and select a value suitable the actual operating state from the table.

Second Preferred Embodiment

A cold-cathode tube lighting device according to a second preferred embodiment of the present invention is installed in a liquid crystal display, in a manner similar to that of the device according to the first preferred embodiment described above. Since a configuration of the liquid crystal display is similar to that according to the first preferred embodiment described above, FIGS. 1 and 2, and the descriptions in the first preferred embodiment described above are incorporated to describe the configuration.

Figure 10:
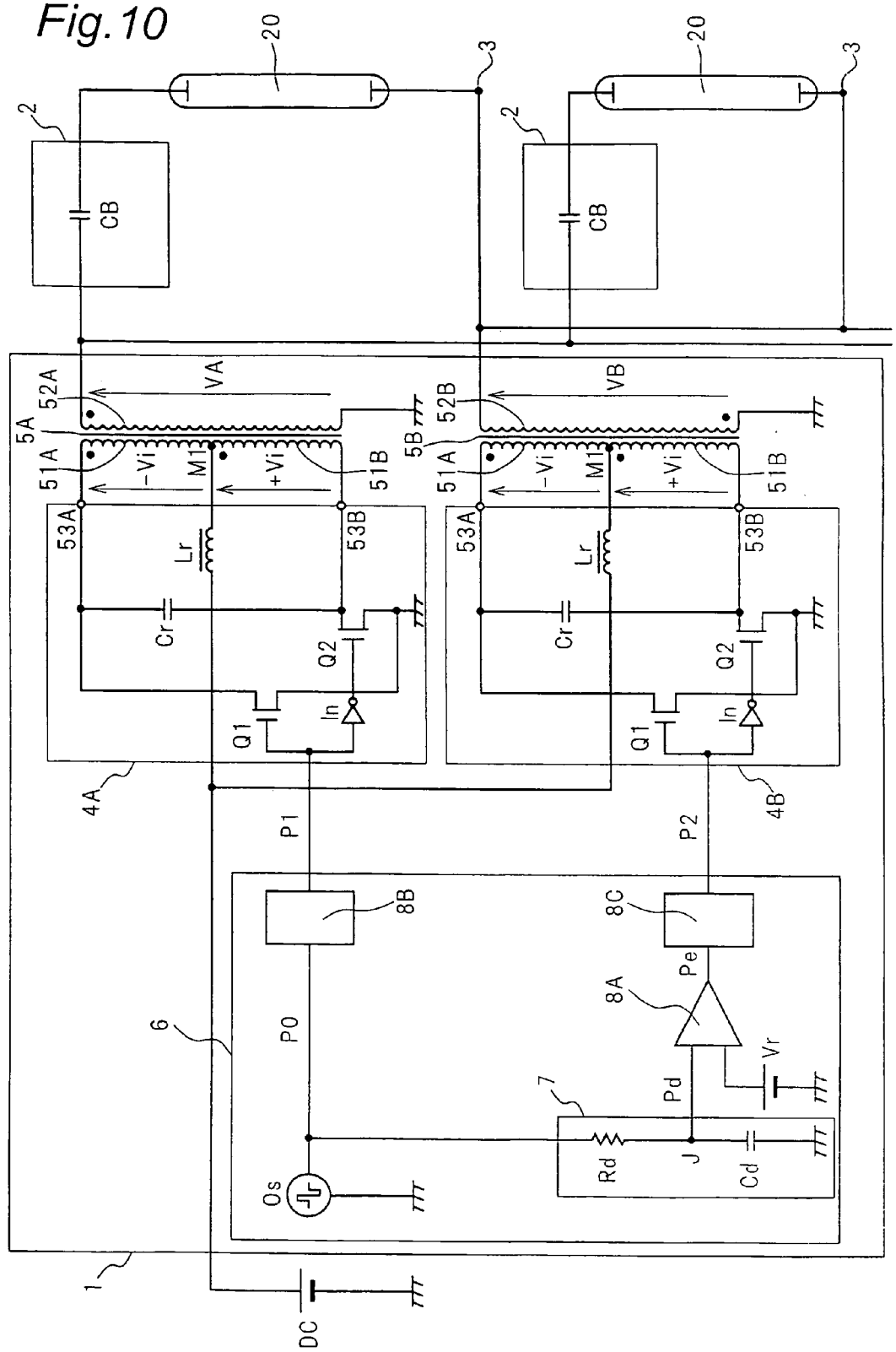
FIG. 10 is a circuit diagram showing a configuration of a cold-cathode tube lighting device according to a second preferred embodiment of the present invention.

FIG. 10 is a circuit diagram showing the configuration of the cold-cathode tube lighting device according to the second preferred embodiment of the present invention. The cold-cathode tube lighting device has components similar to the components (See FIG. 3) of the device according to the first preferred embodiment, except for the configuration of the second block 2. Accordingly, the similar components are designated by the same numerals shown in FIG. 3, and the descriptions in the first preferred embodiment are incorporated to describe them.

In the cold-cathode tube lighting device according to the second preferred embodiment of the present invention, the second block 2 includes a ballast capacitor CB instead of the ballast inductor LB. Further, the second block 2 does not include the matching capacitor CM (See FIG. 3), unlike the second block 2 of the first preferred embodiment.

The capacity of the ballast capacitor CB is relatively small (about several [pF]). Accordingly, the ballast capacitor CB is preferably formed as an inter-layer capacity of the second substrate 50 or the third substrate 60.

Further, when the ballast capacitor CB is used, neither the overcurrent protection capacitor CP nor the matching capacitor CM needs to be arranged. In particular, the ballast capacitor CB plays a role similar to that of the matching capacitor CM of the first preferred embodiment, as described below.

The capacity of each ballast capacitor CB is adjusted separately for each cold-cathode tube 20. In this adjustment, the differences in the installation conditions (for example, wire length or pattern, the distance between the tube wall and the case 10, and the like) among the plurality of cold-cathode tubes 20 are considered in particular.

For example, among the plurality of cold-cathode tubes 20, in the tube nearest to the side face of the case 10, the stray capacitance SC (See FIG. 2) between the tube wall thereof and the side face of the case 10 is larger. Accordingly, the capacitance of the ballast capacitor CB connected to one cold-cathode tube nearest to the side face of the case 10 among the cold-cathode tubes 20 is set at a larger value.

Accordingly, in each combination of the cold-cathode tube 20 and the second block 2, the capacitance of the ballast capacitor CB substantially coincides with the stray capacitances in the periphery of the cold-cathode tube 20. Namely, the impedance of the ballast capacitor CB is matched with the combined impedance of the stray capacitance in the periphery of the cold-cathode tubes 20.

In this case, since the first block 1 is low in output impedance, the impedance matching described above is attained easily.

Further preferably, the impedance of each ballast capacitor CB is set so as to be matched with the impedance of each cold-cathode tube 20 during lighting.

Further, the secondary voltage VA of the step-up transformer 5A and the secondary voltage VB of the step-up transformer 5B are set in the following way so that, in each cold-cathode tube 20, the intermediate point of the electrode potentials at both ends is maintained equal to the ground potential at high precision. Namely, the electrode potentials at both ends are maintained asymmetrically with respect to the ground potential.

Since both step-up transformers 5A and 5B have small leakage flux, each of them can be considered as an alternating-voltage source having low output impedance. Further, as described above, in each of the plurality of cold-cathode tubes 20, the impedance of the ballast capacitor CB is matched with the impedance of the peripheral stray capacitance. Namely, the capacities of the ballast capacitor CB and the peripheral stray capacitance are equal to each other. Accordingly, an appropriate setting value only needs to be determined for any one of the cold-cathode tubes 20.

It is assumed that the capacity of the ballast capacitor CB and the stray capacitance (considered as capacity parallel to the cold-cathode tube 20) of the periphery of the cold-cathode tube 20 is "C", the tube current is "I", and the common frequency of the secondary voltages VA and VB is ω. In this case, the electric potential V1 at the first electrode 21 of the cold-cathode tube 20 is expressed by the following equation (16):

$$V1 = (\tfrac{1}{2}) \times (VA - I/j\omega C). \quad (16)$$

On the other hand, the electric potential V2 at the second electrode 22 of the cold-cathode tube 20 is equal to the secondary voltage VB of the second step-up transformer 5B. In a manner similar to that of the first preferred embodiment, the phase of the secondary voltage VB of the second step-up transformer 5B is delayed from the phase of the secondary voltage VA of the first step-up transformer 5A by π+δ[rad] =180+δ[rad]. Accordingly, the secondary voltage VA of the step-up transformer 5A, the secondary voltage VB of the step-up transformer 5B, and the electric potential V2 at the second electrode 22 are expressed by the above-described equations (5), (6) and (7).

Further, the condition to maintain asymmetrically the voltage V1 at the first electrode 21 and the voltage V2 at the second electrode 22 with respect to the ground potential is the same as the two conditions in the first preferred embodiment (See the equations (8), (9)).

Accordingly, similar to the explanation in the first preferred embodiment, based on the equation (16), setting values of the secondary voltage VA of the step-up transformer 5A, the secondary voltage VB of the step-up transformer 5B, and the shift δ[rad] of the phase difference between the secondary voltages VA and VB from the opposite phase π[rad] are expressed by the following equations (17), (18) and (19):

$$VAe = \{VL^2 + (Ie/\omega C)2\}^{1/2}; \quad (17)$$

$$VBe = VL/2;\ \text{and} \quad (18)$$

$$\delta = -\tan^{-1}\{Ie/(\omega C \times VL)\}. \quad (19)$$

In this case, it is assumed that the effective values of the secondary voltages VA and VB of the respective step-up transformers 5A and 5B are VAe and VBe, respectively, the effective value of the tube current "I" is Ie, and the lamp voltage (effective value) of the cold-cathode tube 20 is VL.

By virtue of the above-mentioned settings, in each cold-cathode tube 20, the electric potentials V1 and V2 at both ends of the second electrode 22 vary uniformly, while they are maintained asymmetrically with respect to the ground potential. Accordingly, in each of the cold-cathode tubes 20, the distribution of the leakage current flowing between each part of the tube wall and the external is symmetrical with respect to the central part of the cold-cathode tube 20. Accordingly, in each of the cold-cathode tubes 20, the imbalance in luminance in the longitudinal direction of each of the cold-cathode tubes 20 is reduced, and this leads to the improved uniformity.

In the cold-cathode tube lighting device according to the second preferred embodiment of the present invention, in a manner similar to that of the device according to the first preferred embodiment, the leakage flux of the step-up transformers 5A and 5B is suppressed, contrary to the presumption in the device according to the prior art. Instead, one ballast capacitor CB is connected to each cold-cathode tube 20. In particular, the impedances of the ballast capacitors CB are separately set so as to cancel out the difference in the peripheral stray capacitance among the plurality of cold-cathode tubes 20. Accordingly, since variations in the tube current "I" does not occur among the plurality of cold-cathode tubes 20, the luminance is maintained uniformly. Thus, the cold-cathode tube lighting device according to the second preferred embodiment of the present invention uniformly lights the plurality of cold-cathode tubes 20 using the common low-impedance power source (first block) 1. In addition, since the wires connected between the first block 1 and the second block 2 may be long and may be different significantly for each of the cold-cathode tubes 20, the layout of the wiring is high in flexibility. Accordingly, the downsizing of the whole device is realized easily.

In the cold-cathode tube lighting device according to the second preferred embodiment of the present invention, in a manner similar to that of the device according to the first preferred embodiment, by using the two step-up transformers 5A and 5B obtained by dividing a step-up transformer, withstand voltages of the circuit elements connected to the step-up transformers 5A and 5B can be reduced by half compared to those when one step-up transformer is used. In particular, the withstand voltage of the step-up transformer itself is reduced by half. Accordingly, since it is significantly possible to realize the downsizing of the step-up transformer, the downsizing of the cold-cathode tube lighting device according to the second preferred embodiment of the present invention is easily realized.

Further, the size of the ballast capacitor CB is significantly smaller than the size of the inductor. In particular, since the ballast capacitor CB can be formed as the inter-layer capacity of the second substrate 50 and the like, the ballast capacitor CB only has a thickness of about the substrate. Further, when the ballast capacitor CB is used, the overcurrent protection capacitor CP and the matching capacitor CM may be omitted, unlike the above-described first preferred embodiment.

Thus, in particular, in the cold-cathode tube lighting device according to the second preferred embodiment of the present invention, the second block 2 can be easily downsized. Accordingly, the cold-cathode tube lighting device according to the second preferred embodiment of the present invention is extremely effective in thinning liquid crystal displays.

In the cold-cathode tube lighting device according to the second preferred embodiment of the present invention, in a manner similar to that of the device according to the first preferred embodiment, the phase correction circuit 6 maintains the phase difference between the electrode potentials V1 and V2 at both ends of the cold-cathode tube 20 equal to π[rad]=180° at high precision. Thus, in each of the cold-cathode tubes 20, the electrode potentials V1 and V2 at both ends of the cold-cathode tubes 20 are maintained asymmetrically with respect to the ground potential. Accordingly, each of the cold-cathode tubes 20 entirely emits light at uniform luminance.

In the cold-cathode tube lighting device according to the second preferred embodiment of the present invention, the fluctuation of the operating state of each of the cold-cathode tubes 20 is absorbed by each ballast capacitor CB. Accordingly, the phase difference between the secondary voltage VA of the step-up transformer 5A and the secondary voltage VB of the step-up transformer 5B is hardly affected by the variations in the operating state among the plurality of cold-cathode tubes 20. Accordingly, the phase difference simply needs to be maintained at a substantially constant quantity for all the cold-cathode tubes 20. The phase correction circuit 6 easily maintains the above-mentioned phase difference to be equal to the constant quantity 180+δ[deg] using the delay circuit 7.

In addition, the phase correction circuit may calculate the secondary voltages VA and VB of the step-up transformers 5A and 5B and the phase difference 180+δ[deg] between the secondary voltages VA and VB, based on the actual operating state of the cold-cathode tube 20 and the like with a logic circuit such as a CPU. Instead, the phase correction circuit may store the table of the secondary voltages VA and VB of the step-up transformers 5A and 5B and the phase difference 180+δ[deg] between the secondary voltages VA and VB, and select a value suitable the actual operating state from the table.

Third Preferred Embodiment

A cold-cathode tube lighting device according to a third preferred embodiment of the present invention is installed in a liquid crystal display, in a manner similar to that of the device according to the first preferred embodiment described above. Since a configuration of the liquid crystal display is similar to that according to the first preferred embodiment described above, FIGS. 1 and 2, and the descriptions in the first preferred embodiment described above are incorporated to describe the configuration.

Figure 11:
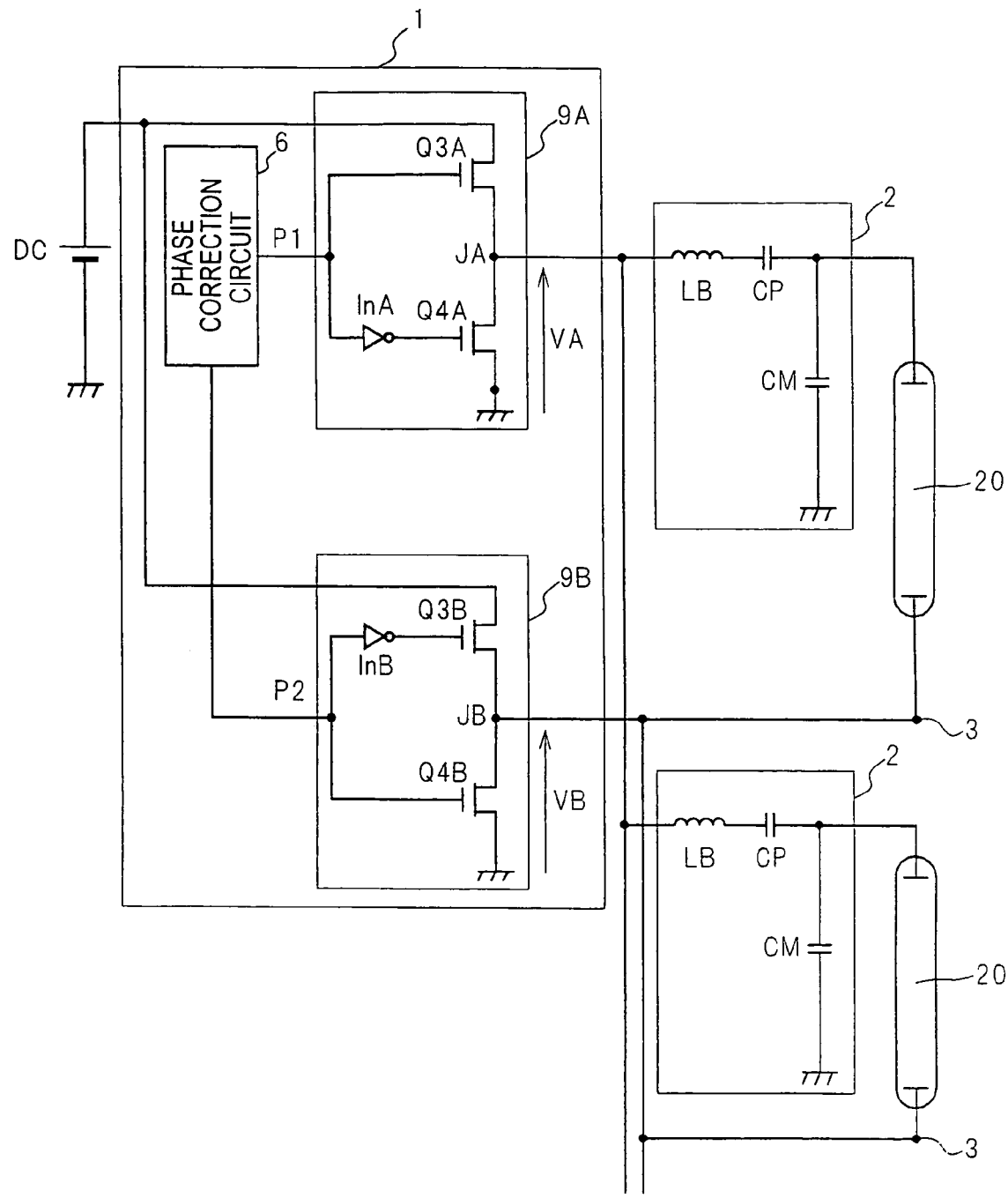
FIG. 11 is a circuit diagram showing a configuration of a cold-cathode tube lighting device according to a third preferred embodiment of the present invention.

FIG. 11 is a circuit diagram showing the configuration of the cold-cathode tube lighting device according to the third preferred embodiment of the present invention. The cold-cathode tube lighting device has components similar to the components (See FIG. 3) of the device according to the first preferred embodiment, except for the configuration of the first block 1. Accordingly, the similar components are designated by the same numerals shown in FIG. 3, and the descriptions in the first preferred embodiment are incorporated to describe them.

The first block 1 includes one pair of output circuits 9A and 9B, and the phase correction circuit 6.

The pair of output circuits 9A and 9B have configurations similar to each other. The output circuits 94A includes a series connection of a high-side power transistor Q3A and a low-side power transistor Q4A, and an inverter InA, and the output circuits 94B includes a series connection of a high-side power transistor Q3B and a low-side power transistor Q4B, and an inverter InB.

The positive electrode of the direct-current power source DC is connected to one terminal of the high-side power transistor Q3A and one terminal of the high-side power transistor Q3B, and the negative electrode thereof is grounded. The other terminal of the high-side power transistor Q3A is connected to one terminal of the low-side power transistor Q4A, and the other terminal of the high-side power transistor Q3B is connected to one terminal of the low-side power transistor Q4B. The other terminal of the low-side power transistor Q4A and the other terminal of the low-side power transistor Q4B are grounded, respectively. In this case, the high-side power transistors Q3A and Q3B and the low-side power transistors Q4A and Q4B are preferably MOS FETs. In addition, they may be IGBTs or bipolar transistors.

The phase correction circuit 6 directly sends the first pulse signal P1 to a control terminal of the high-side power transistor Q3A of the first output circuit 9A, and sends the first pulse signal P1 to a control terminal of the low-side power transistor Q4A via the inverter InA.

The phase correction circuit 6 sends the second pulse signal P2 to a control terminal of the high-side power transistor Q3B of the second output circuit 9B via the inverter InB, and directly sends the second pulse signal P2 to a control terminal of the low-side power Transistor.

The connection point JA of the two power transistors Q3A and the Q4A in the first output circuit 9A is connected to each electrode at one end of each of the cold-cathode tubes 20 via each second block 2.

The connection point JB of the two power transistors Q3B and the Q4B in the second output circuit 9B is connected to each electrode at the other end of each of the cold-cathode tubes 20 via each connection point 3.

The direct-current DC maintains its output voltage Vi at a constant value, preferably half value (for example, 750[V]) of the lamp voltage of the cold-cathode tube 20. The phase correction circuit 6 sends the pulse signals P1 and P2 each having a constant frequency (for example, 45 [kHz]) to the two output circuits 9A and 9B.

In the first output circuit 9A, the inverter InA inverts the polarity of the first pulse signal P1 to be inputted to the control terminal of the low-side power transistor Q4A with respect to the polarity of the first pulse signal P1 inputted to the control terminal of the high-side power transistor Q3A.

In the second output circuit 9B, the inverter InB inverts the polarity of the second pulse signal P2 to be inputted to the control terminal of the high-side power transistor Q3B with respect to the polarity of the second pulse signal P2 inputted to the control terminal of the low-side power transistor Q4B.

Accordingly, in each of the output circuits 9A and 9B, the high-side power transistor and the low-side power transistor are turned on and off alternately at a frequency same as the frequency (for example, 45 [kHz]) of the pulse signals P1 and P2. Thus, electric potentials VA and VB at the connection points JA and JB each takes a value of either the output voltage Vi of the direct-current power source DC and the ground potential (≈0) alternately.

Thus, the first block 1 converts the output voltage Vi from the direct-current power source DC into alternating-voltages each having high frequency (for example, 45 [kHz]).

In a manner similar to that of the first preferred embodiment, the effective value of the output voltage VB of the second output circuit 9B is set to be equal to the half value VL/2 of the lamp voltage of the cold-cathode tube 20, and the effective value of the output voltage VA of the first output circuit 9A is set to be lower than the half value VL/2 of the lamp voltage of the cold-cathode tube 20. Further, by virtue of the setting of the phase difference between the pulse signals P1 and P2, the phase of the output voltage VB of the second output circuit 9B is delayed from the phase of the output voltage VA of the first output circuit 9A by 180+δ[deg]. Thus, the electrode potentials V1 and V2 at both ends of each of the cold-cathode tubes 20 vary uniformly, while they are maintained asymmetrically with respect to the ground potential. Accordingly, in each of the cold-cathode tubes 20, the distribution of the leakage current flowing between each part of the tube wall and the external is symmetrical with respect to the central part of the cold-cathode tube 20. Accordingly, in each of the cold-cathode tubes 20, the imbalance in luminance in the longitudinal direction of each of the cold-cathode tubes 20 is reduced, and this leads to the improved uniformity.

In the cold-cathode tube lighting device according to the third preferred embodiment of the present invention, since an output stage of the first block 1 is constructed by the power transistors as described above, the output impedance of the first block 1 is low. That is, in a manner similar to that of the device of the first preferred embodiment, the first block 1 functions as one pair of low-impedance power sources. Accordingly, similar to the settings in the first preferred embodiment, by setting the impedance of the ballast inductor LB and the impedance of the matching capacitor CM for each cold-cathode tube 20, no variation occurs in tube current among the plurality of cold-cathode tubes 20. Thus, the cold-cathode tube lighting device according to the third preferred embodiment of the present invention uniformly and stably lights the plurality of cold-cathode tubes 20 using the common low-impedance power source (first block) 1. In addition, since the wires connected between the first block 1 and the second block 2 may be long and may be different significantly for each of the cold-cathode tubes 20, the layout of the wiring is high in flexibility. Accordingly, the downsizing of the whole device is realized easily.

In the cold-cathode tube lighting device according to the third preferred embodiment of the present invention, the impedance of each matching capacitor CM is separately set so as to cancel out the difference in the stray capacitance among the plurality of cold-cathode tubes 20. Instead of or in addition to the impedance of the matching capacitor CM, the impedance of each ballast inductor LB may be separately set so as to cancel out the difference in the stray capacitance among the plurality of cold-cathode tubes 20.

In the cold-cathode tube lighting device according to the third preferred embodiment of the present invention, the phase correction circuit 6 maintains the phase difference between the electrode potentials V1 and V2 at both ends of the cold-cathode tube 20 equal to 180° at high precision. Thus, in each of the cold-cathode tubes 20, the electrode potentials V1 and V2 at both ends of the cold-cathode tubes 20 are maintained asymmetrically with respect to the ground potential. Accordingly, each of the cold-cathode tubes 20 entirely emits light at uniform luminance.

In addition, by using the two output circuits 9A and 9B obtained by dividing an output circuit, withstand voltages of the circuit elements connected to the two output circuits 9A and 9B can be reduced by half compared to those when one output circuit is used. In particular, the withstand voltages of the power transistors are reduced by half. Accordingly, the downsizing of the cold-cathode tube lighting device according to the third preferred embodiment of the present invention is easily realized.

In the cold-cathode tube lighting device according to the third preferred embodiment of the present invention, the fluctuation of the operating state of each of the cold-cathode tubes 20 is absorbed by each ballast inductor LB. Accordingly, the phase difference between the output voltage VA of output circuit 9A and the output voltage VB of the output circuit 9B is hardly affected by the variations in the operating state among the plurality of cold-cathode tubes 20. Accordingly, the phase difference simply needs to be maintained at a substantially constant quantity for all the cold-cathode tubes 20. The phase correction circuit 6 easily maintains the above-mentioned phase difference to be equal to the constant quantity 180+δ[deg] using the delay circuit 7.

In addition, the phase correction circuit may calculate the output voltages VA and VB of the output circuits 9A and 9B and the phase difference 180+δ[deg] between the output voltages VA and VB, based on the actual operating state of the cold-cathode tube 20 and the like with a logic circuit such as a CPU. Instead, the phase correction circuit may store the table of the output voltages VA and VB of the output circuits 9A and 9B and the phase difference 180+δ[deg] between the output voltages VA and VB, and select a value suitable the actual operating state from the table.

In the cold-cathode tube lighting device according to the third preferred embodiment of the present invention, in a manner similar to that of the above-described second preferred embodiment, the second block 2 may include the ballast capacitor CB.

The size of the ballast capacitor CB is significantly smaller than the size of the ballast inductor LB. In particular, since the ballast capacitor CB can be formed as the inter-layer capacity of the second substrate 50 and the like, the ballast capacitor CB only has a thickness of about the substrate. Further, when the ballast capacitor CB is used, the overcurrent protection capacitor CP and the matching capacitor CM may be omitted.

Thus, in particular, in the cold-cathode tube lighting device according to the third preferred embodiment of the present invention, the second block 2 can be easily downsized. Accordingly, the cold-cathode tube lighting device according to the third preferred embodiment of the present invention is extremely effective in thinning liquid crystal displays.

Fourth Preferred Embodiment

A cold-cathode tube lighting device according to a fourth preferred embodiment of the present invention is installed in a liquid crystal display, in a manner similar to that of the device according to the first preferred embodiment described above. Since a configuration of the liquid crystal display is similar to that according to the first preferred embodiment described above, FIGS. 1 and 2, and the descriptions in the first preferred embodiment described above are incorporated to describe the configuration.

Figure 12:
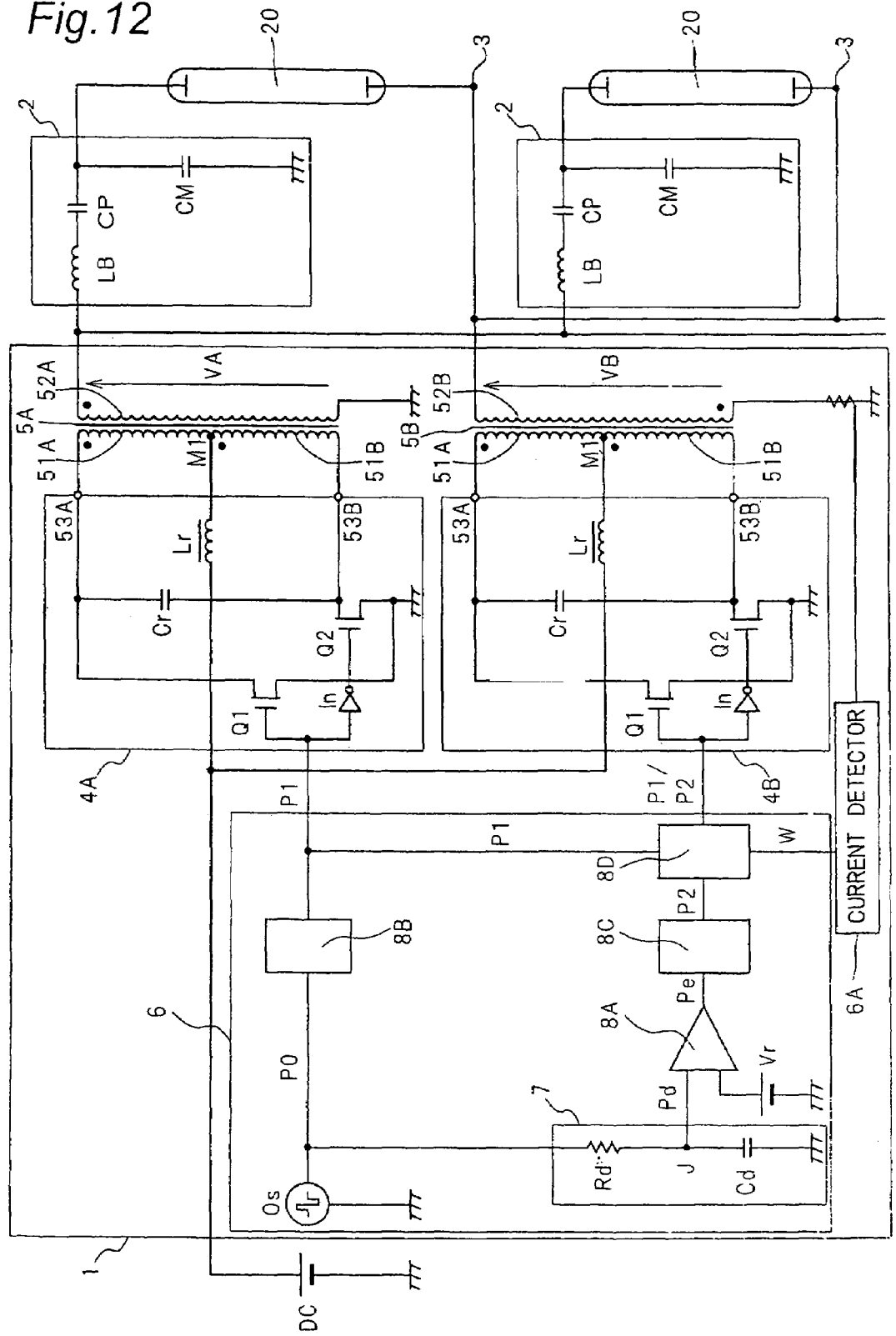
FIG. 12 is a circuit diagram showing a configuration of a cold-cathode tube lighting device according to a fourth preferred embodiment of the present invention.

FIG. 12 is a circuit diagram showing the configuration of the cold-cathode tube lighting device according to the fourth preferred embodiment of the present invention. The cold-cathode tube lighting device has components similar to the components (See FIG. 3) of the device according to the first preferred embodiment, except for a current detector 6A and a selector 8D. Accordingly, the similar components are designated by the same numerals shown in FIG. 3, and the descriptions in the first preferred embodiment are incorporated to describe them.

The current detector 6A is connected across the ground terminal and the secondary winding 52B of the second step-up transformer 5B, for example. In addition, the current detector 6A may also be connected across the connection terminal 3 and the secondary winding 52B of the second step-up transformer 5B, across the ground terminal and the secondary winding 52B of the first step-up transformer 5A, or across the secondary winding 52A of the first step-up transformer 5A and the second block 2.

The current detector 6A detects the tube current of the cold-cathode tubes 20. When a detected tube current value is smaller than a predetermined threshold value, the current detector 6A sends a stop signal "W" to the selector 8D in the phase correction circuit 6. On the other hand, when the detected tube current value is greater than the predetermined threshold value, the current detector 6A stops sending the stop signal "W" to the selector 8D.

The selector 8D is inserted into between the second flip-flop 8C and the second high frequency oscillator circuit 4B, and the first pulse signal P1 and the second pulse signal P2 are inputted thereto. Further, the selector 8D selects one of the first pulse signal P1 and the second pulse signal P2 in the following way, in response to the stop signal "W" from the current detector 6A, and sends a selected pulse signal to the second high frequency oscillator circuit 4B.

The selector 8D selects the first pulse signal P1 in reception of the stop signal "W". In this case, the phase difference between the secondary voltage VA of the step-up transformer 5A and the secondary voltage VB of the step-up transformer 5B is maintained substantially equal to 180°.

The selector 8D selects the second pulse signal P2 in non-reception of the stop signal "W". In this case, the phase difference between the secondary voltage VA of the step-up transformer 5A and the secondary voltage VB of the step-up transformer 5B is shifted from 180° by δ[deg].

During the time when the cold-cathode tube 20 is off, since the space between the electrodes at both ends of the cold-cathode tube 20 is opened, a phase shift of the output by the second block 2 substantially does not occur. On the other hand, at the start of lighting the cold-cathode tube 20, the current detector 6A sends out the stop signal "W", while the tube current is small. The phase correction circuit 6 maintains the phase difference between the secondary voltage VA of the step-up transformer 5A and the secondary voltage VB of the step-up transformer 5B substantially equal to 180°, in response to the stop signal "W". Thus, the electrode potentials at both ends of each cold-cathode tube 20 changes in opposite phase with respect to each other.

Thus, at the start of lighting the cold-cathode tube 20, the voltage across both ends of the cold-cathode tube 20 reaches the firing potential rapidly and reliably at all of the cold-cathode tubes 20. Namely, all of the cold-cathode tubes 20 are lit rapidly and reliably.

Along with the start of lighting the cold-cathode tube 20, the tube current thereof increases. The current detector 6A then stops sending the stop signal "W", so that the phase correction circuit 6 maintains the phase difference between the secondary voltage VA of the step-up transformer 5A and the secondary voltage VB of the step-up transformer 5B equal to 180+δ[deg]. In a manner similar to that of the first preferred embodiment, since the phase difference cancels out the phase shift of an applied voltage by the second block 2, the phase difference between the electrode potentials at both ends of each cold-cathode tube 20 is maintained equal to 180° at high precision.

Thus, the electrode potentials at both ends of each of the cold-cathode tubes 20 vary uniformly, while they are maintained asymmetrically with respect to the ground potential. Accordingly, in each of the cold-cathode tubes 20, the distribution of the leakage current flowing between each part of the tube wall and the external is symmetrical with respect to the central part of the cold-cathode tube 20. Accordingly, in each of the cold-cathode tubes 20, the imbalance in luminance in the longitudinal direction of each of the cold-cathode tubes 20 is reduced, and this leads to the improved uniformity.

In the cold-cathode tube lighting device according to the fourth preferred embodiment of the present invention, in a manner similar to that of the device according to the first preferred embodiment, the first block 1 functions as one pair of low-impedance power sources. Accordingly, similar to the settings in the first preferred embodiment, by setting the impedance of the ballast inductor LB and the impedance of the matching capacitor CM for each cold-cathode tube 20, no variation occurs in tube current among the plurality of cold-cathode tubes 20. Thus, the cold-cathode tube lighting device according to the fourth preferred embodiment of the present invention uniformly and stably lights the plurality of cold-cathode tubes 20 using the common low-impedance power source (first block) 1. In addition, since the wires connected between the first block 1 and the second block 2 may be long and may be different significantly for each of the cold-cathode tubes 20, the layout of the wiring is high in flexibility. Accordingly, the downsizing of the whole device is realized easily.

In the cold-cathode tube lighting device according to the fourth preferred embodiment of the present invention, the impedance of each matching capacitor CM is separately set so as to cancel out the difference in the stray capacitance among the plurality of cold-cathode tubes 20. Instead of or in addition to the impedance of the matching capacitor CM, the impedance of each ballast inductor LB may be separately set so as to cancel out the difference in the stray capacitance among the plurality of cold-cathode tubes 20.

Further, in the cold-cathode tube lighting device according to the fourth preferred embodiment of the present invention, the phase correction circuit 6 detects the tube current using the current detector 6A, and based on a detected value, adjusts the phase difference between the secondary voltage VA of the step-up transformer 5A and the secondary voltage VB of the step-up transformer 5B. Namely, when the tube current is smaller than a predetermined threshold, the above-mentioned phase difference is maintained equal to 180°, and when the tube current is larger than the predetermined threshold, the above-mentioned phase difference is maintained equal to 180+δ[deg]. Thus, regardless of the value of the tube current, the phase difference between the electrode potentials V1 and V2 at both ends of each of the cold-cathode tubes 20 is maintained equal to 180° at high precision. Accordingly, at the start of lighting the cold-cathode tube 20, all of the cold-cathode tubes 20 are lit rapidly and reliably. On the other hand, during lighting of the cold-cathode tube 20, the electrode potentials V1 and V2 at both ends of each of the cold-cathode tubes 20 are maintained asymmetrically with respect to the ground potential. Accordingly, in each of the cold-cathode tubes 20, the imbalance in luminance in the longitudinal direction of each of the cold-cathode tubes 20 is reduced, and this leads to the improved uniformity.

The above-described adjustment of the phase difference based on the detected value detected by the current detector 6A is also effective in a PWM lighting control.

In the PWM lighting control, a cold-cathode tube repeats blinking at a carrier frequency (for example, 200 [Hz]) of the PWM. Namely, for example, the cold-cathode tube is lit during the on period and turned off during the off period of the PWM. The brightness of the cold-cathode tube is controlled by adjusting the on-duty of the PWM.

At the start of the on period of the PWM, the phase difference between the secondary voltage VA of the step-up transformer 5A and the secondary voltage VB of the step-up transformer 5B is maintained equal to 180°, while the tube current is small. Thus, through out the entire on period of the PWM, the phase difference between the electrode potentials V1 and V2 at both ends of each of the cold-cathode tubes 20 is maintained equal to 180° at high precision. Accordingly, during the on period of the PWM, all of the cold-cathode tubes 20 are lit rapidly and reliably. Accordingly, the reliability of the PWM lighting control is thus high.

Instead of the above-described adjustment of the phase difference based on the detected value detected by the current detector 6A, the phase correction circuit 6 may maintain the phase difference between the secondary voltage VA of the step-up transformer 5A and the secondary voltage VB of the step-up transformer 5B equal to 180° during a constant time interval (for example, a constant multiple of a period of the pulse signals P1 and P2) at the start of lighting the cold-cathode tube 20. For example, when the frequency of the pulse signal is 45 [kHz], and the above constant time interval is set to 10 times the period of the pulse signal, the constant time interval is 220 [μsec]. Thus, in a manner similar to above, all of the cold-cathode tubes 20 are lit rapidly and reliably.

In addition, in the cold-cathode tube lighting device according to the fourth preferred embodiment of the present invention, by using the two step-up transformers 5A and 5B obtained by dividing a step-up transformer, withstand voltages of the circuit elements connected to the step-up transformers 5A and 5B can be reduced by half compared to those when one step-up transformer is used. In particular, the withstand voltage of the step-up transformer itself is reduced by half. Accordingly, since it is significantly possible to realize the downsizing of the step-up transformer, the downsizing of the cold-cathode tube lighting device according to the fourth preferred embodiment of the present invention is easily realized.

In the cold-cathode tube lighting device according to the fourth preferred embodiment of the present invention, the fluctuation of the operating state of each of the cold-cathode tubes 20 is absorbed by each ballast inductor LB. Accordingly, the phase difference between the secondary voltage VA of the step-up transformer 5A and the secondary voltage VB of the step-up transformer 5B is hardly affected by the variations in the operating state among the plurality of cold-cathode tubes 20. Accordingly, during lighting of the cold-cathode tube 20, the phase difference simply needs to be maintained at a substantially constant quantity for all the cold-cathode tubes 20. The phase correction circuit 6 easily maintains the above-mentioned phase difference to be equal to the constant quantity 180+δ[deg] using the delay circuit 7.

In addition, the phase correction circuit may calculate the secondary voltages VA and VB of the step-up transformers 5A and 5B and the phase difference 180+δ[deg] between the secondary voltages VA and VB, based on the actual operating state of the cold-cathode tube 20 and the like with a logic circuit such as a CPU. Instead, the phase correction circuit may store the table of the secondary voltages VA and VB of the step-up transformers 5A and 5B and the phase difference 180+δ[deg] between the secondary voltages VA and VB, and select a value suitable the actual operating state from the table.

In the cold-cathode tube lighting device according to the fourth preferred embodiment of the present invention, in a manner similar to that of the above-described second preferred embodiment, the second block 2 may include the ballast capacitor CB.

The size of the ballast capacitor CB is significantly smaller than the size of the ballast inductor LB. In particular, since the ballast capacitor CB can be formed as the inter-layer capacity of the second substrate 50 and the like, the ballast capacitor CB only has a thickness of about the substrate. Further, when the ballast capacitor CB is used, the overcurrent protection capacitor CP and the matching capacitor CM may be omitted.

Thus, in particular, in the cold-cathode tube lighting device according to the fourth preferred embodiment of the present invention, the second block 2 can be easily downsized. Accordingly, the cold-cathode tube lighting device according to the fourth preferred embodiment of the present invention is extremely effective in thinning liquid crystal displays.

Fifth Preferred Embodiment

A cold-cathode tube lighting device according to a fifth preferred embodiment of the present invention is installed in a liquid crystal display, in a manner similar to that of the device according to the first preferred embodiment described above. Since a configuration of the liquid crystal display is similar to that according to the first preferred embodiment described above, FIGS. 1 and 2, and the descriptions in the first preferred embodiment described above are incorporated to describe the configuration.

Figure 13:
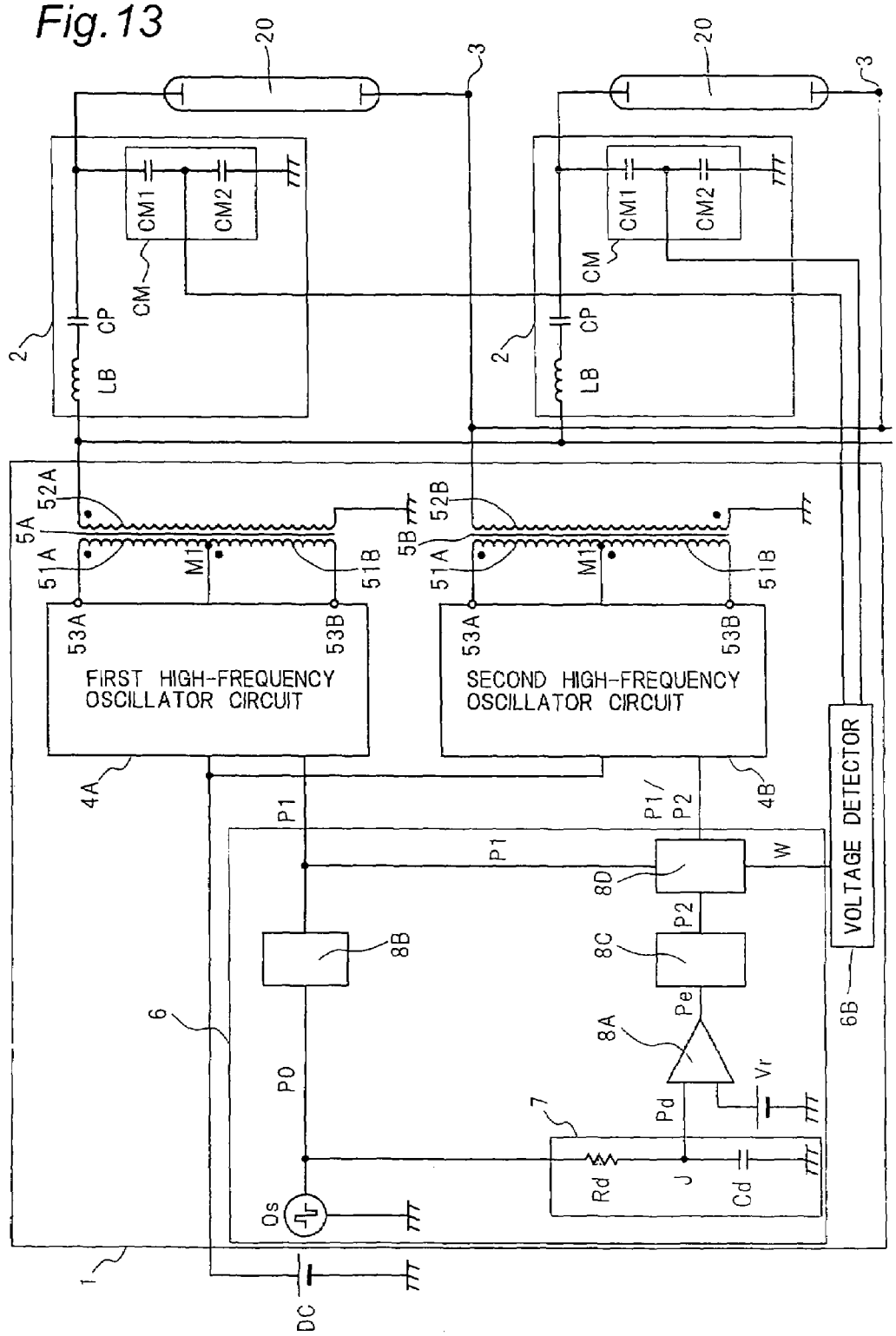
FIG. 13 is a circuit diagram showing a configuration of a cold-cathode tube lighting device according to a fifth preferred embodiment of the present invention.
Figure 14:
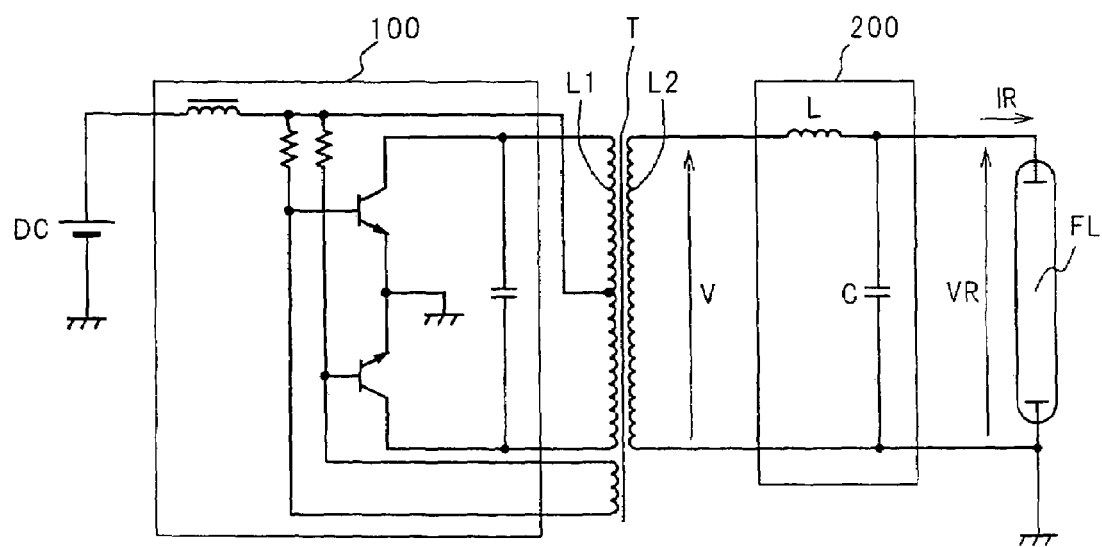
FIG. 14 is a circuit diagram showing a configuration of a cold-cathode tube lighting device according to a prior art.

FIG. 13 is a circuit diagram showing the configuration of the cold-cathode tube lighting device according to the fifth preferred embodiment of the present invention. The cold-cathode tube lighting device has components similar to the components (See FIG. 12) of the device according to the fourth preferred embodiment, except for a voltage detector 6B and the matching capacitor CM. Accordingly, the similar components are designated by the same numerals shown in FIG. 12, and the descriptions in the fourth preferred embodiment are incorporated to describe them.

The matching capacitor CM is a series connection of two matching capacitors CM1 and CM2.

The voltage detector 6B is connected to a connection point of the two matching capacitors CM1 and CM2 for each second block 2, so as to detect an electric potential at the connection point. When at least one of electric potentials detected at the second blocks 2 is not within a predetermined range, the voltage detector 6B sends a stop signal "W" to the selector 8D in the phase correction circuit 6. On the other had, when the electric potentials detected at all of the second blocks 2 are within the predetermined range, the voltage detector 6B stops sending the stop signal "W" to the selector 8D.

During the time when the cold-cathode tube 20 is off, since the space between the electrodes at both ends is opened, a phase shift of the output by the second block 2 substantially does not occur. On the other hand, at the start of lighting the cold-cathode tube 20, the voltage detector 6B sends out the stop signal "W", while the amplitudes of the respective electrode potentials are larger than the amplitude of when the cold-cathode tube 20 is lit. The phase correction circuit 6 maintains the phase difference between the secondary voltage VA of the step-up transformer 5A and the secondary voltage VB of the step-up transformer 5B substantially equal to 180°, in response to the stop signal "W". Thus, the electrode potentials at both ends of each cold-cathode tube 20 changes in opposite phase with respect to each other.

Thus, at the start of lighting the cold-cathode tube 20, the voltage across both ends of the cold-cathode tube 20 reaches the firing potential rapidly and reliably at all of the cold-cathode tubes 20. Namely, all of the cold-cathode tubes 20 are lit rapidly and reliably.

Along with the start of lighting the cold-cathode tube 20, the tube current thereof increases. Then, the amplitudes of the electrode potentials of the cold-cathode tubes 20 decrease to a predetermined range. Accordingly, the voltage detector 6B stops sending the stop signal "W", and the phase correction circuit 6 maintains the phase difference between the secondary voltage VA of the step-up transformer 5A and the secondary voltage VB of the step-up transformer 5B equal to 180+δ[deg], in a manner similar to that of the fourth preferred embodiment. In a manner similar to that of the first preferred embodiment, since the phase difference cancels out the phase shift of an applied voltage by the second block 2, the phase difference between the electrode potentials at both ends of each cold-cathode tube 20 is maintained equal to 180° at high precision.

Thus, the electrode potentials at both ends of each of the cold-cathode tubes 20 vary uniformly, while they are maintained asymmetrically with respect to the ground potential. Accordingly, in each of the cold-cathode tubes 20, the distribution of the leakage current flowing between each part of the tube wall and the external is symmetrical with respect to the central part of the cold-cathode tube 20. Accordingly, in each of the cold-cathode tubes 20, the imbalance in luminance in the longitudinal direction of each of the cold-cathode tubes 20 is reduced, and this leads to the improved uniformity.

In the cold-cathode tube lighting device according to the fifth preferred embodiment of the present invention, in a manner similar to that of the device according to the first preferred embodiment, the first block 1 functions as one pair of low-impedance power sources. Accordingly, similar to the settings in the first preferred embodiment, by setting the impedance of the ballast inductor LB and the impedance of the matching capacitor CM for each cold-cathode tube 20, no variation occurs in tube current among the plurality of cold-cathode tubes 20. Thus, the cold-cathode tube lighting device according to the fifth preferred embodiment of the present invention uniformly and stably lights the plurality of cold-cathode tubes 20 using the common low-impedance power source (first block) 1. In addition, since the wires connected between the first block 1 and the second block 2 may be long and may be different significantly for each of the cold-cathode tubes 20, the layout of the wiring is high in flexibility. Accordingly, the downsizing of the whole device is realized easily.

In the cold-cathode tube lighting device according to the fifth preferred embodiment of the present invention, the impedance of each matching capacitor CM is separately set so as to cancel out the difference in the stray capacitance among the plurality of cold-cathode tubes 20. Instead of or in addition to the impedance of the matching capacitor CM, the impedance of each ballast inductor LB may be separately set so as to cancel out the difference in the stray capacitance among the plurality of cold-cathode tubes 20.

Further, in the cold-cathode tube lighting device according to the fifth preferred embodiment of the present invention, the phase correction circuit 6 detects the electrode potentials using the voltage detector 6B, and based on detected values, adjusts the phase difference between the secondary voltage VA of the step-up transformer 5A and the secondary voltage VB of the step-up transformer 5B. Namely, when the electrode potential is not within a predetermined range, the above-mentioned phase difference is maintained equal to 180°, and when the electrode potentials are within the predetermined range, the above-mentioned phase difference is maintained equal to 180+δ[deg]. Thus, regardless of the value of the tube current, the phase difference between the electrode potentials V1 and V2 at both ends of each of the cold-cathode tubes 20 is maintained equal to 180° at high precision. Accordingly, at the start of lighting the cold-cathode tube 20, all of the cold-cathode tubes 20 are lit rapidly and reliably. On the other hand, during lighting of the cold-cathode tube 20, the electrode potentials V1 and V2 at both ends of each of the cold-cathode tubes 20 are maintained asymmetrically with respect to the ground potential. Accordingly, in each of the cold-cathode tubes 20, the imbalance in luminance in the longitudinal direction of each of the cold-cathode tubes 20 is reduced, and this leads to the improved uniformity.

The above-described adjustment of the phase difference based on the detected value detected by the voltage detector 6B is also effective in a PWM lighting control.

At the start of the on period of the PWM, the phase difference between the secondary voltage VA of the step-up transformer 5A and the secondary voltage VB of the step-up transformer 5B is maintained equal to 180°, while the electrode potential of the cold-cathode tube 20 is large beyond the predetermined range. Thus, through out the entire on period of the PWM, the phase difference between the electrode potentials V1 and V2 at both ends of each of the cold-cathode tubes 20 is maintained equal to 180° at high precision. Accordingly, during the on period of the PWM, all of the cold-cathode tubes 20 are lit rapidly and reliably. Accordingly, the reliability of the PWM lighting control is thus high.

Instead of the above-described adjustment of the phase difference based on the detected value detected by the voltage detector 6B, the phase correction circuit 6 may maintain the phase difference between the secondary voltage VA of the step-up transformer 5A and the secondary voltage VB of the step-up transformer 5B equal to 180° during a constant time interval (for example, a constant multiple of a period of the pulse signals P1 and P2) at the start of lighting the cold-cathode tube 20. For example, when the frequency of the pulse signal is 45 [kHz], and the above constant time interval is set to 10 times the period of the pulse signal, the constant time interval is 220 [μsec]. Thus, in a manner similar to above, all of the cold-cathode tubes 20 are lit rapidly and reliably.

In addition, in the cold-cathode tube lighting device according to the fifth preferred embodiment of the present invention, by using the two step-up transformers 5A and 5B obtained by dividing a step-up transformer, withstand voltages of the circuit elements connected to the step-up transformers 5A and 5B can be reduced by half compared to those when one step-up transformer is used. In particular, the withstand voltage of the step-up transformer itself is reduced by half. Accordingly, since it is significantly possible to realize the downsizing of the step-up transformer, the downsizing of the cold-cathode tube lighting device according to the fifth preferred embodiment of the present invention is easily realized.

In the cold-cathode tube lighting device according to the fifth preferred embodiment of the present invention, the fluctuation of the operating state of each of the cold-cathode tubes 20 is absorbed by each ballast inductor LB. Accordingly, the phase difference between the secondary voltage VA of the step-up transformer 5A and the secondary voltage VB of the step-up transformer 5B is hardly affected by the variations in the operating state among the plurality of cold-cathode tubes 20. Accordingly, during lighting of the cold-cathode tube 20, the phase difference simply needs to be maintained at a substantially constant quantity for all the cold-cathode tubes 20. The phase correction circuit 6 easily maintains the above-mentioned phase difference to be equal to the constant quantity 180+δ[deg] using the delay circuit 7.

In addition, the phase correction circuit may calculate the secondary voltages VA and VB of the step-up transformers 5A and 5B and the phase difference 180+δ[deg] between the secondary voltages VA and VB, based on the actual operating state of the cold-cathode tube 20 and the like with a logic circuit such as a CPU. Instead, the phase correction circuit may store the table of the secondary voltages VA and VB of the step-up transformers 5A and 5B and the phase difference 180+δ[deg] between the secondary voltages VA and VB, and select a value suitable the actual operating state from the table.

In the cold-cathode tube lighting device according to the fifth preferred embodiment of the present invention, in a manner similar to that of the above-described second preferred embodiment, the second block 2 may include the ballast capacitor CB.

The size of the ballast capacitor CB is significantly smaller than the size of the ballast inductor LB. In particular, since the ballast capacitor CB can be formed as the inter-layer capacity of the second substrate 50 and the like, the ballast capacitor CB only has a thickness of about the substrate. Further, when the ballast capacitor CB is used, the overcurrent protection capacitor CP and the matching capacitor CM may be omitted.

Thus, in particular, in the cold-cathode tube lighting device according to the fifth preferred embodiment of the present invention, the second block 2 can be easily downsized. Accordingly, the cold-cathode tube lighting device according to the fifth preferred embodiment of the present invention is extremely effective in thinning liquid crystal displays.

INDUSTRIAL APPLICABILITY

The cold-cathode tube lighting device according to the present invention is installed, for example, as a backlight driving device in a liquid crystal display, adopts a low-impedance power source, sets a ballast for each cold-cathode tube, and controls the phase difference between the outputs of the power source using the phase correction circuit as described above. Accordingly, the present invention is obviously useful for industrial applications.

The invention claimed is:

1. A cold-cathode tube lighting device comprising:
a plurality of ballasts, at least one of said ballasts being connected to an electrode at one end of each of a plurality of cold-cathode tubes;
a first low-impedance power source having an output impedance lower than a combined impedance of said cold-cathode tubes, said first low-impedance power source being connected to the electrode at one end of each of said cold-cathode tubes via said ballasts;
a second low-impedance power source having an output impedance lower than the combined impedance of said cold-cathode tubes, said second low-impedance power source being connected to an electrode at the other end of each of said cold-cathode tubes; and
a phase correction circuit for adjusting a phase difference between an output from said first low-impedance power source and an output from said second low-impedance power source, so that electrode potentials at both ends of each of said cold-cathode tubes change in opposite phase with respect to each other,
wherein said phase correction circuit comprises a delay circuit for delaying one of a first pulse signal for instructing an output timing with respect to said first low-impedance power source and a second pulse signal for instructing an output timing with respect to said second low-impedance power source, from the other signal by a constant quantity.

2. The cold-cathode tube lighting device as claimed in claim 1,
wherein said first low-impedance power source, said second low-impedance power source, and said phase correction circuit are mounted on a first substrate, and
wherein said ballasts are mounted on a second substrate.

3. The cold-cathode tube lighting device as claimed in claim 2,
wherein one end of each of said cold-cathode tubes is connected to said second substrate.

4. The cold-cathode tube lighting device as claimed in claim 1,
further comprising a detector for detecting current flowing through said cold-cathode tubes, or an electrode potential at one end of each of said cold-cathode tubes,
wherein said phase correction circuit changes the phase difference based on a detected value detected by said detector.

5. The cold-cathode tube lighting device as claimed in claim 1,
wherein each of said first low-impedance power source and said second low-impedance power source comprises a transformer connected to said ballasts, and said transformer has an output impedance lower than the combined impedance of said plurality of cold-cathode tubes.

6. The cold-cathode tube lighting device as claimed in claim 5,
wherein said transformer comprises a core, a primary winding being wound around said core, and a secondary winding being wound around at least one of an inside and outside of said primary winding.

7. The cold-cathode tube lighting device as claimed in claim 6,
wherein said secondary winding has one configuration of a sectional winding and a honeycomb winding.

8. The cold-cathode tube lighting device as claimed in claim 1,
wherein each of said first low-impedance power source and said second low-impedance power source comprises a power transistor connected to said ballasts.

9. The cold-cathode tube lighting device as claimed in claim 1,
wherein each of said ballasts comprises an inductor.

10. The cold-cathode tube lighting device as claimed in claim 9,
wherein said inductor has one configuration of a sectional winding and a honeycomb winding.

11. The cold-cathode tube lighting device as claimed in claim 10,
wherein said inductor comprises a saturable reactor.

12. The cold-cathode tube lighting device as claimed in claim 1,
wherein each of said ballasts comprises a capacitor.

13. The cold-cathode tube lighting device as claimed in claim 12,
wherein said capacitor has an inter-layer capacity of a substrate.

14. The cold-cathode tube lighting device as claimed in claim 1, further comprising:
matching capacitors, at least one of said matching capacitors being connected across a ground potential and the electrode at one end of each cold-cathode tube connected to said ballast.

15. The cold-cathode tube lighting device as claimed in claim 14, wherein each of said matching capacitors has an inter-layer capacity of a substrate.

16. The cold-cathode tube lighting device as claimed in claim 14,
wherein an impedance of said ballast and an impedance of said matching capacitor are matched with each other.

17. The cold-cathode tube lighting device as claimed in claim 14,
wherein an impedance of said ballast, a combined impedance of said matching capacitor and a stray capacitance in the periphery of said cold-cathode tube, and an impedance of said cold-cathode tube during lighting are matched with each other.

18. A liquid crystal display comprising:
a plurality of cold-cathode tubes;
a liquid crystal panel installed on the front side of said cold-cathode tubes, said liquid crystal panel shielding light emitted from said cold-cathode tubes using a predetermined pattern; and
a cold-cathode tube lighting device,
wherein said cold-cathode tube lighting device comprises:
a plurality of ballasts, at least one of said ballasts being connected to an electrode at one end of each of said plurality of cold-cathode tubes;
a first low-impedance power source having an output impedance lower than a combined impedance of said cold-cathode tubes, said first low-impedance power source being connected to the electrode at one end of each of said cold-cathode tubes via said ballasts;
a second low-impedance power source having an output impedance lower than the combined impedance of said cold-cathode tubes, said second low-impedance power source being connected to an electrode at the other end of each of said cold-cathode tubes; and
a phase correction circuit for adjusting a phase difference between an output from said first low-impedance power source and an output from said second low-impedance power source, so that electrode potentials at both ends of each of said cold-cathode tubes change in opposite phase with respect to each other, wherein said phase correction circuit comprises a delay circuit for delaying one of a first pulse signal for instructing an output timing with respect to said first low-impedance power source and a second pulse signal for instructing an output timing with respect to said second low-impedance power source, from the other signal by a constant quantity.

* * * * *